March 15, 1955  J. T. FERRY ET AL  2,704,024
DATA COMPARING AND RECORD POSTING MACHINE
Filed March 16, 1951  35 Sheets-Sheet 1

MASTER SIDE  DETAIL SIDE

INVENTORS
JOHN T. FERRY
ERICH H. MOBIUS
JOHN L. STERLING
BY J.L. Sterling
ATTORNEY

FIG.2

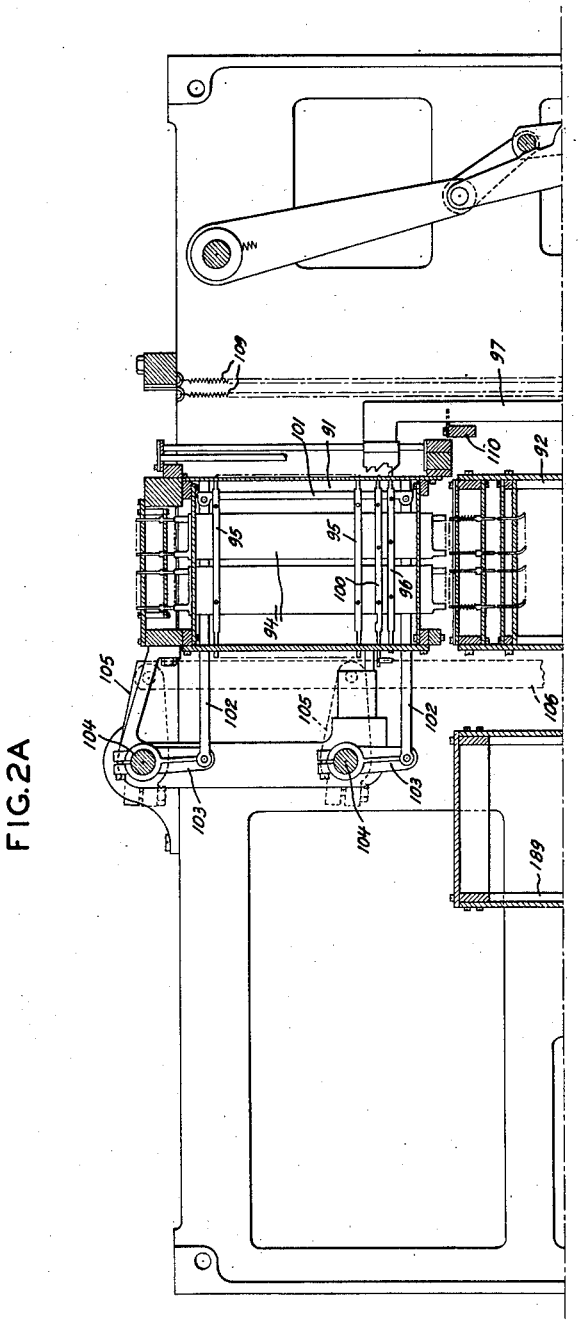

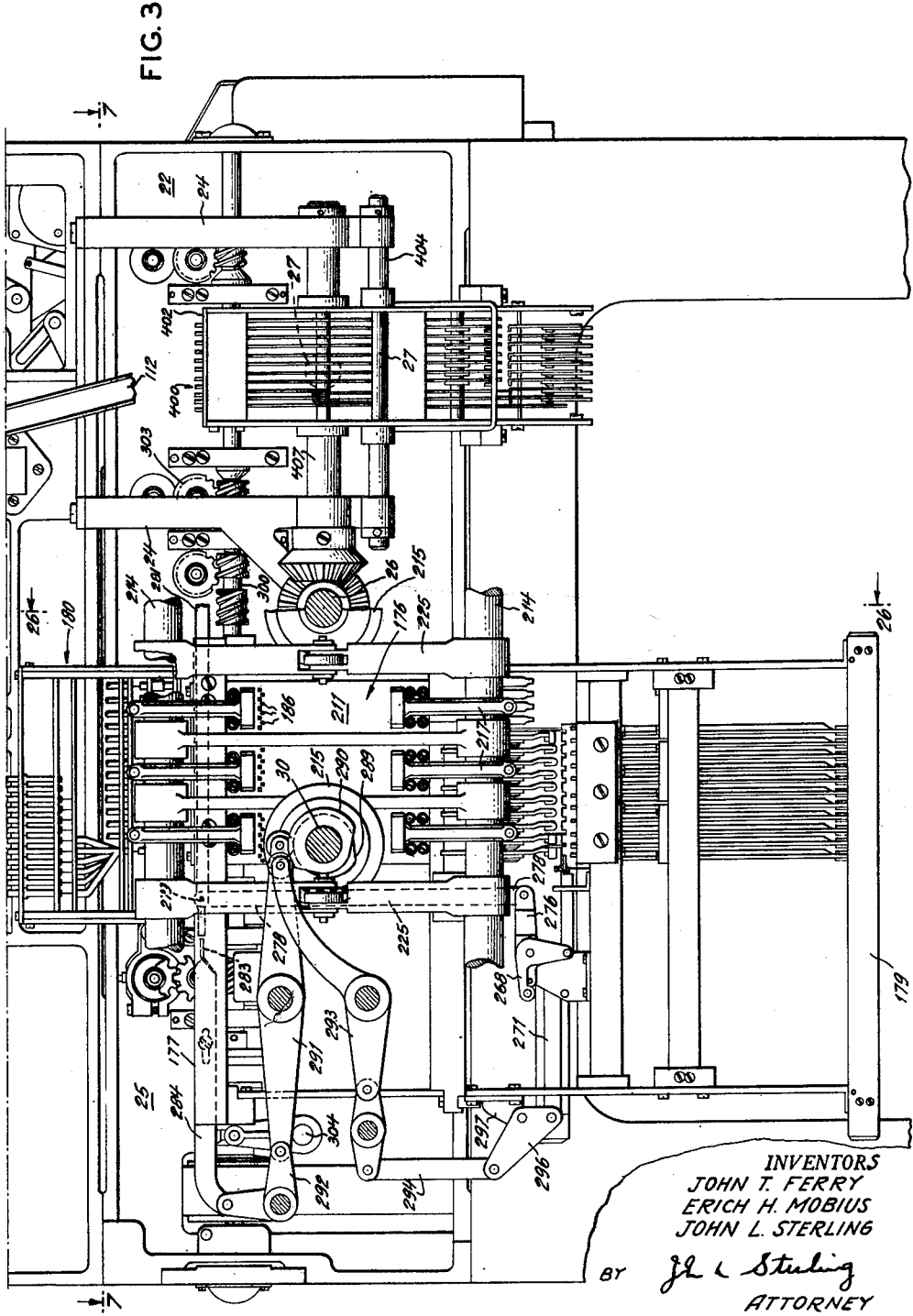

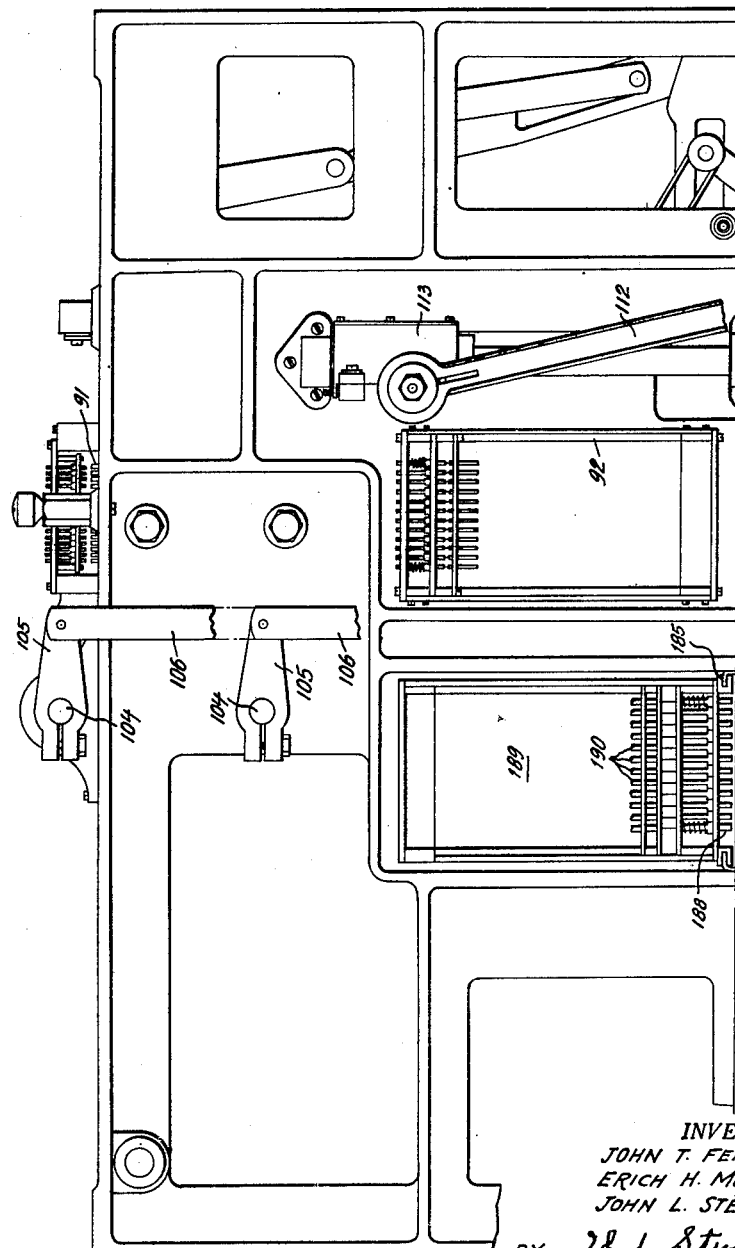

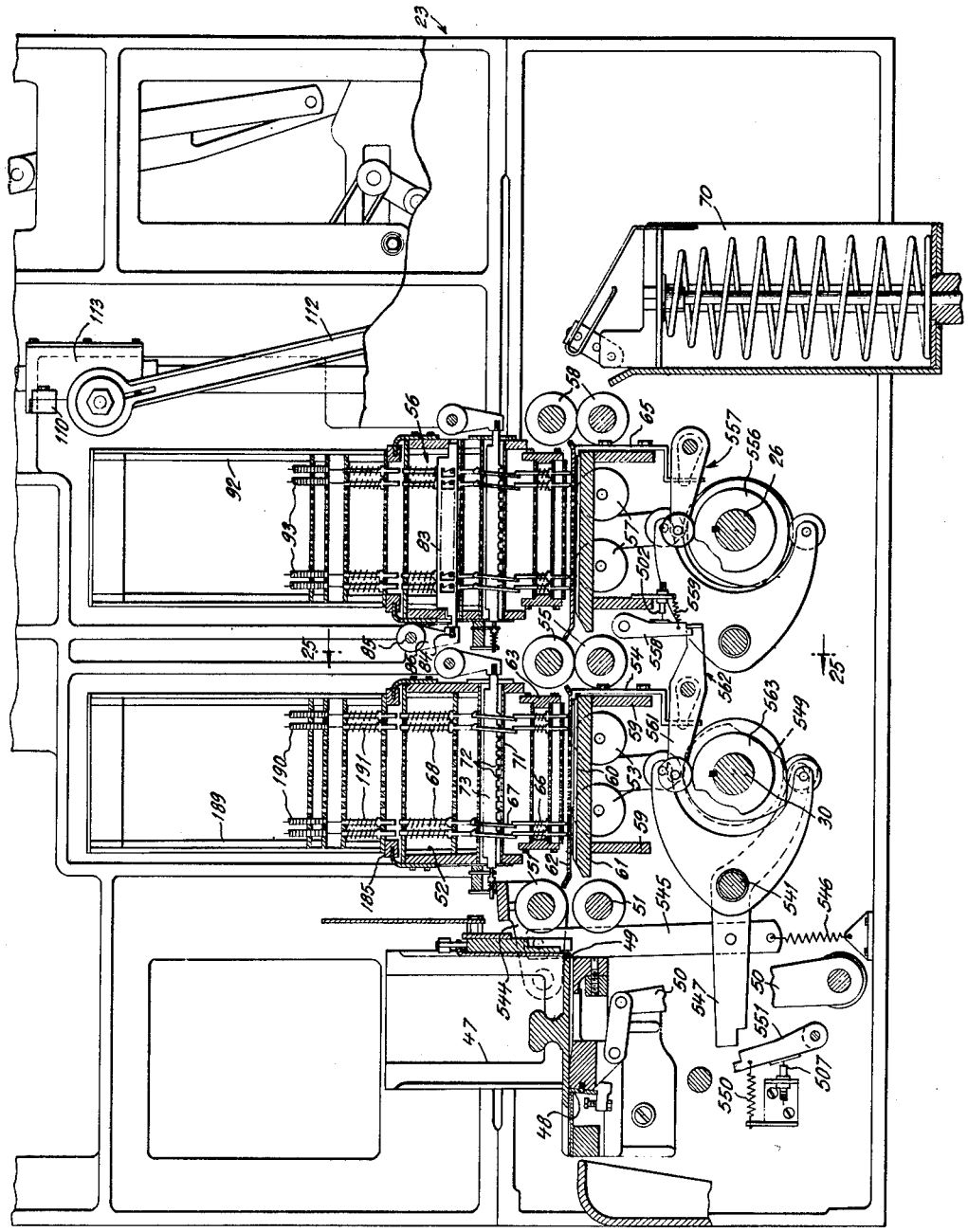

March 15, 1955  J. T. FERRY ET AL  2,704,024
DATA COMPARING AND RECORD POSTING MACHINE
Filed March 16, 1951  35 Sheets-Sheet 7

INVENTORS
JOHN T. FERRY
ERICH H. MOBIUS
JOHN L. STERLING
BY John L Sterling
ATTORNEY

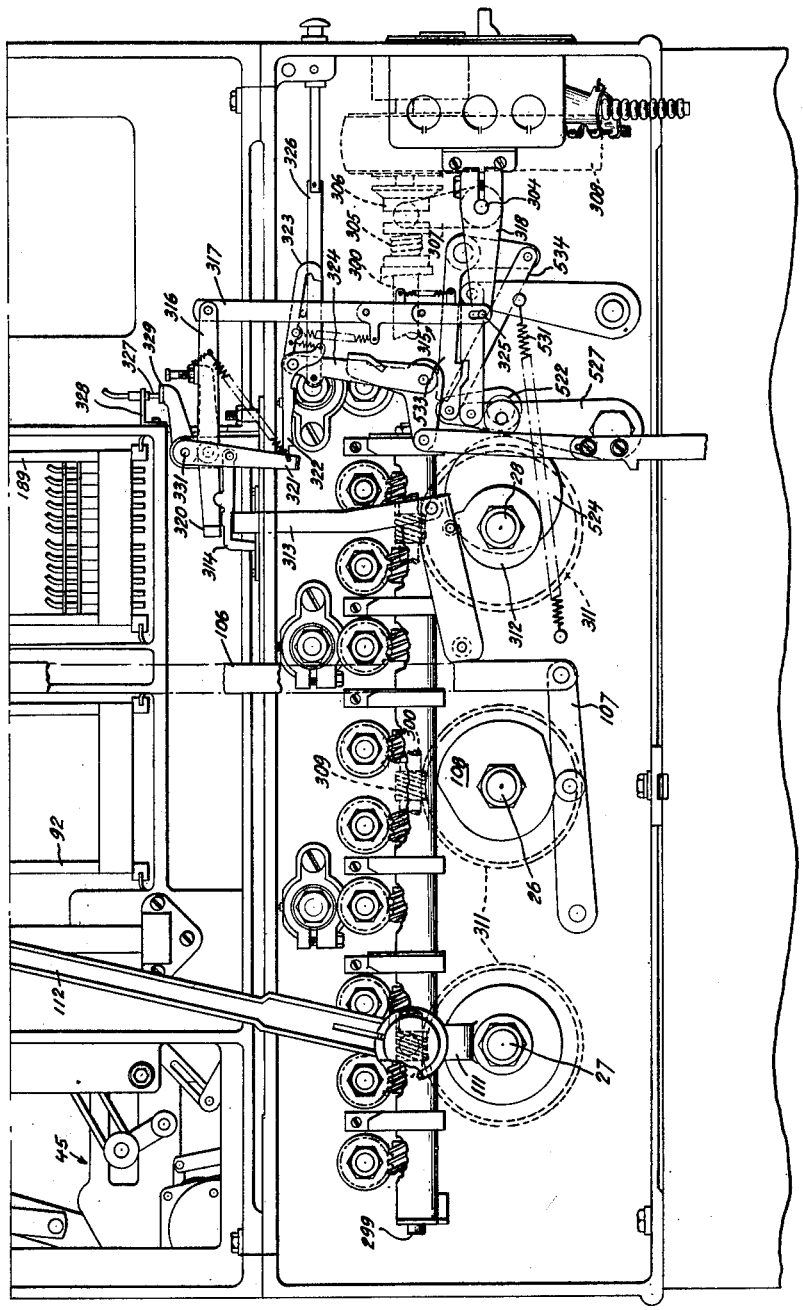

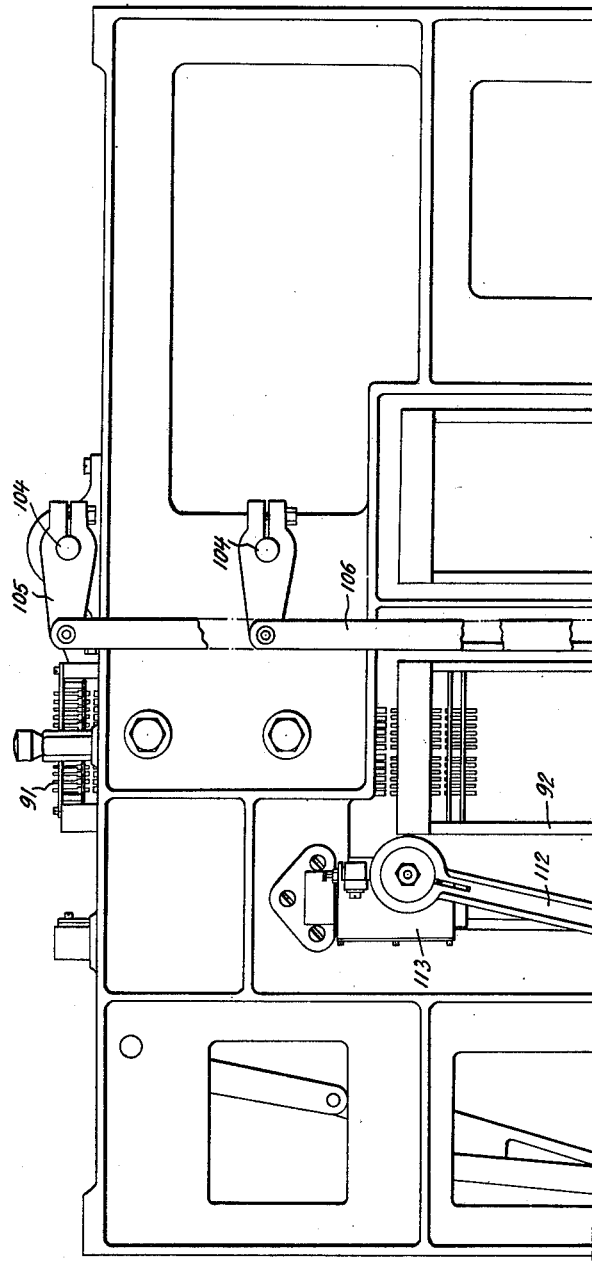

March 15, 1955   J. T. FERRY ET AL   2,704,024
DATA COMPARING AND RECORD POSTING MACHINE
Filed March 16, 1951   35 Sheets-Sheet 11

Inventor.
JOHN T. FERRY
ERICH H. MOBIUS
JOHN L. STERLING
By
J& L Sterling
Attorney INVENTORS
JOHN T. FERRY
ERICH H. MOBIUS
JOHN L. STERLING
BY John L. Sterling
ATTORNEY March 15, 1955   J. T. FERRY ET AL   2,704,024
DATA COMPARING AND RECORD POSTING MACHINE
Filed March 16, 1951   35 Sheets-Sheet 13

INVENTORS
JOHN T. FERRY
ERICH H. MOBIUS
JOHN L. STERLING
BY  *J. L. Sterling*
ATTORNEY

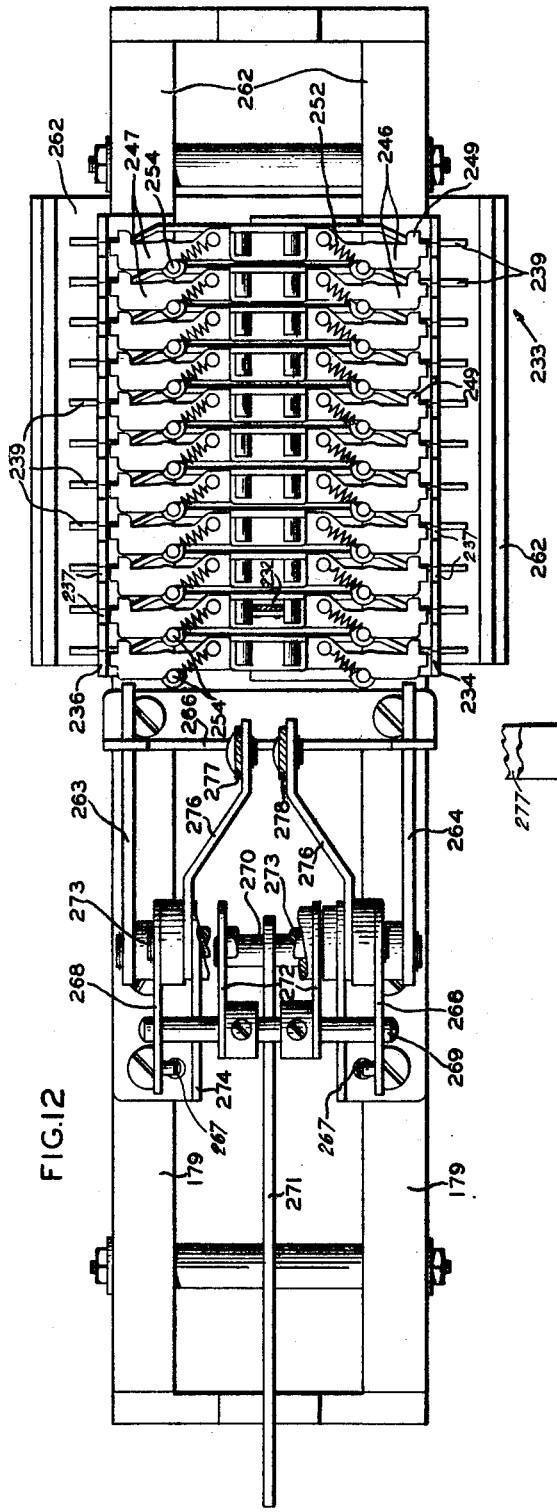
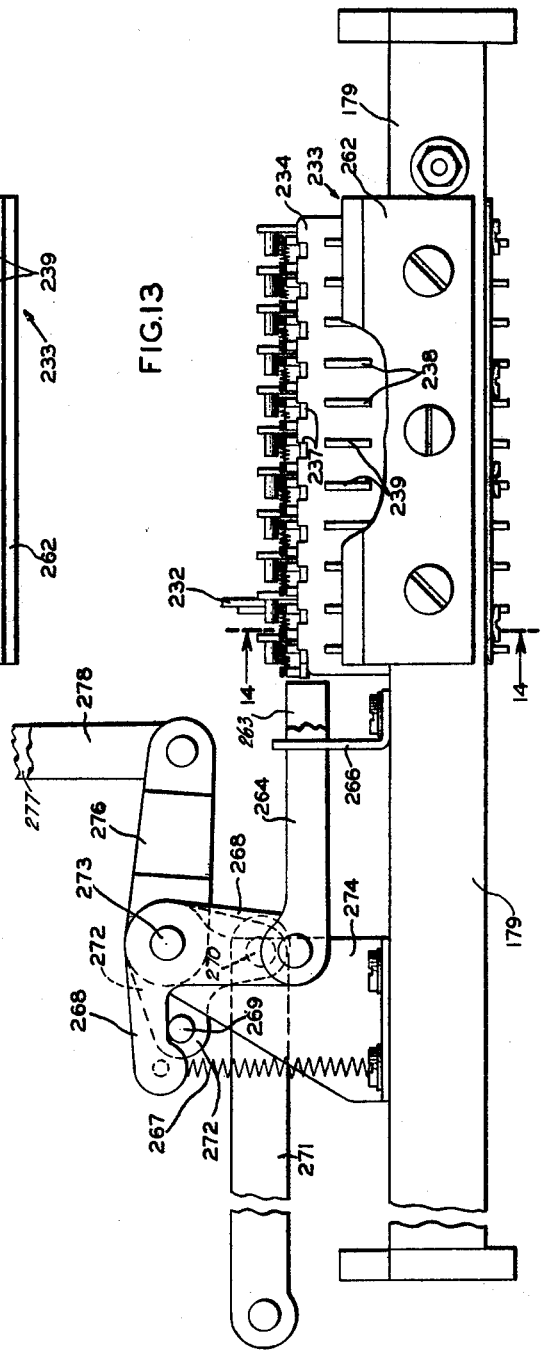

March 15, 1955     J. T. FERRY ET AL     2,704,024

DATA COMPARING AND RECORD POSTING MACHINE

Filed March 16, 1951                         35 Sheets-Sheet 15

INVENTORS
JOHN T. FERRY
ERICH H. MOBIUS
JOHN L. STERLING

BY *John L. Sterling*
ATTORNEY

March 15, 1955  J. T. FERRY ET AL  2,704,024
DATA COMPARING AND RECORD POSTING MACHINE
Filed March 16, 1951  35 Sheets-Sheet 16
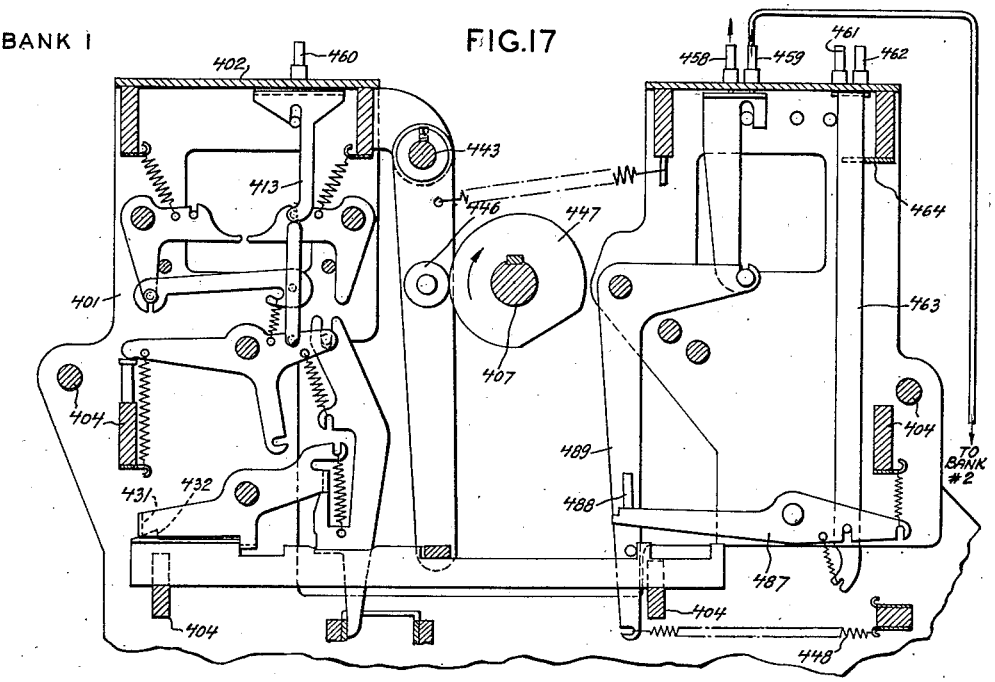
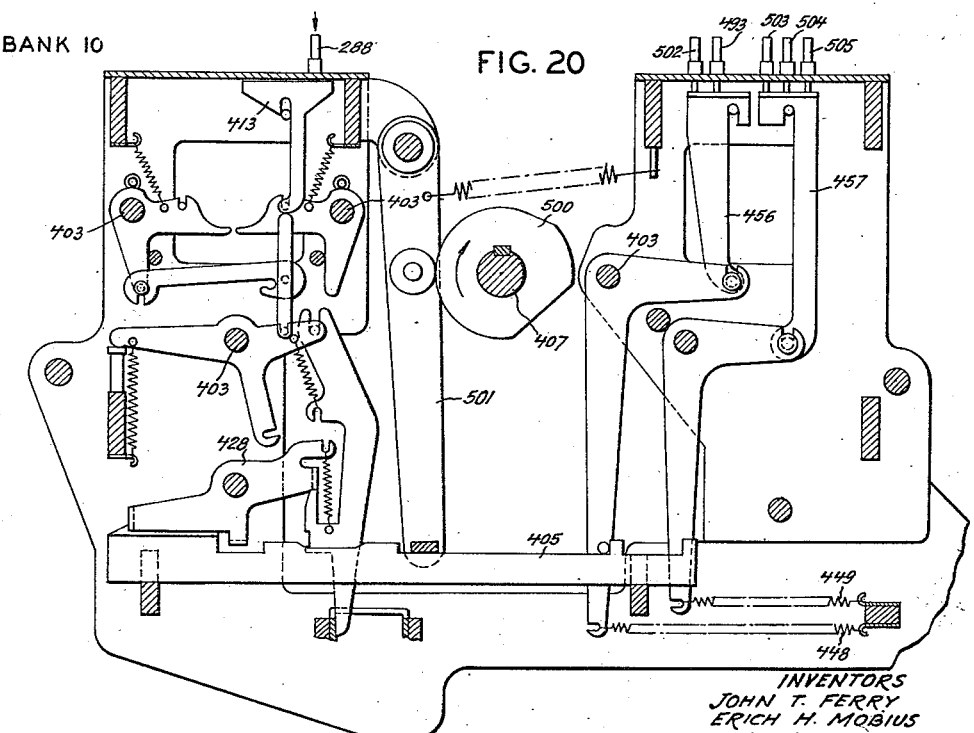
INVENTORS
JOHN T. FERRY
ERICH H. MOBIUS
JOHN L. STERLING
BY John L. Sterling
ATTORNEY

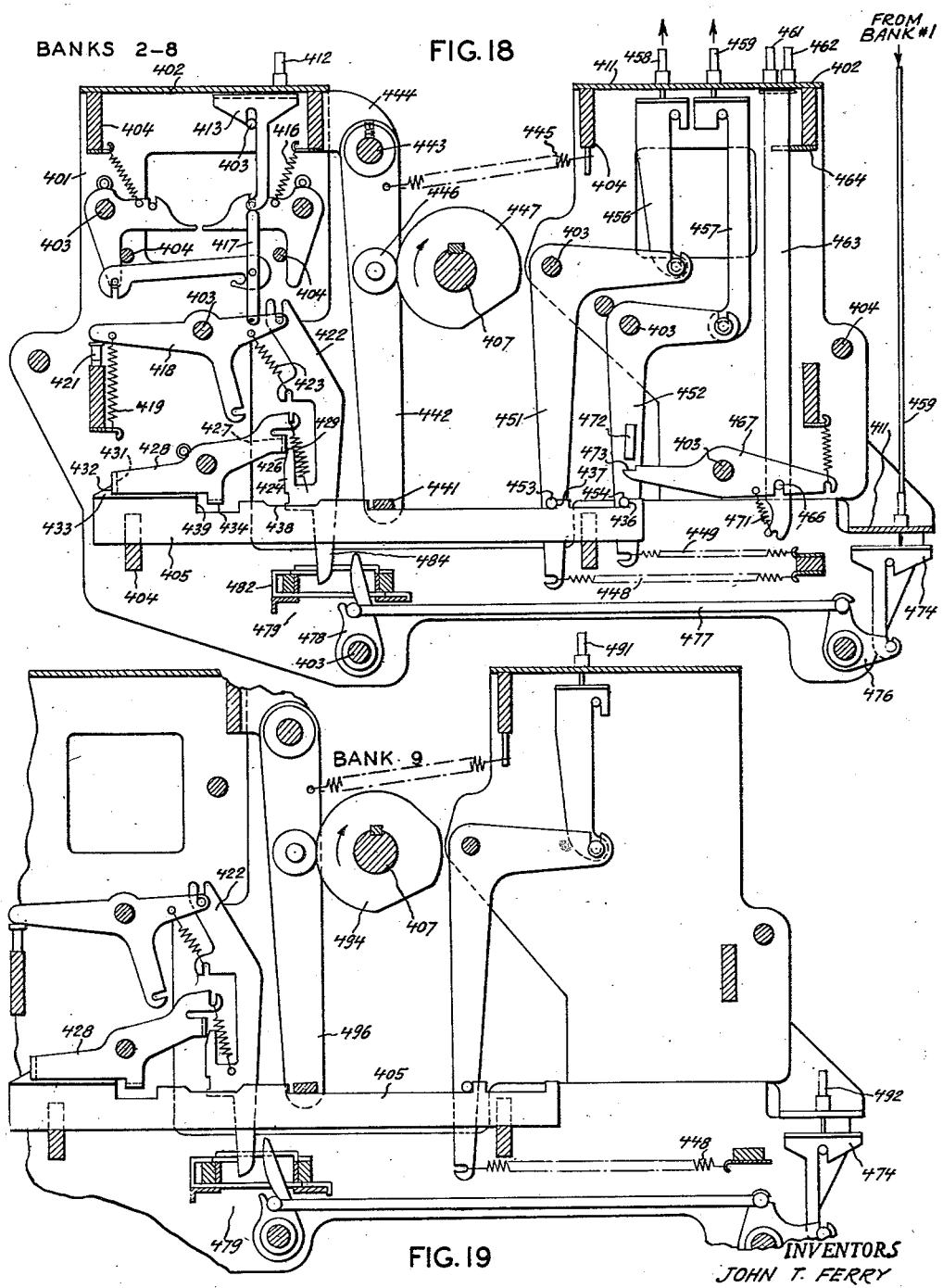

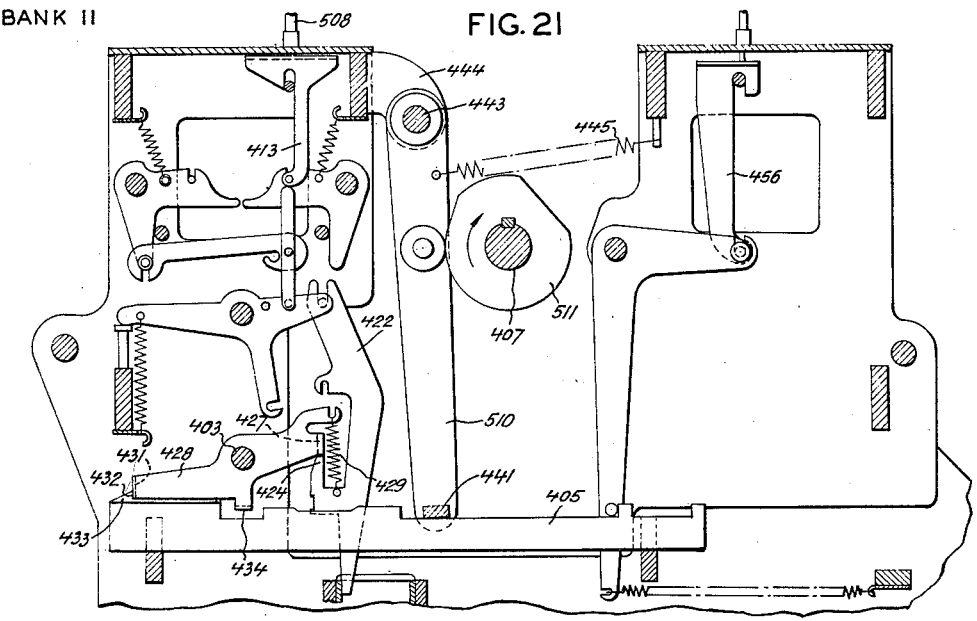

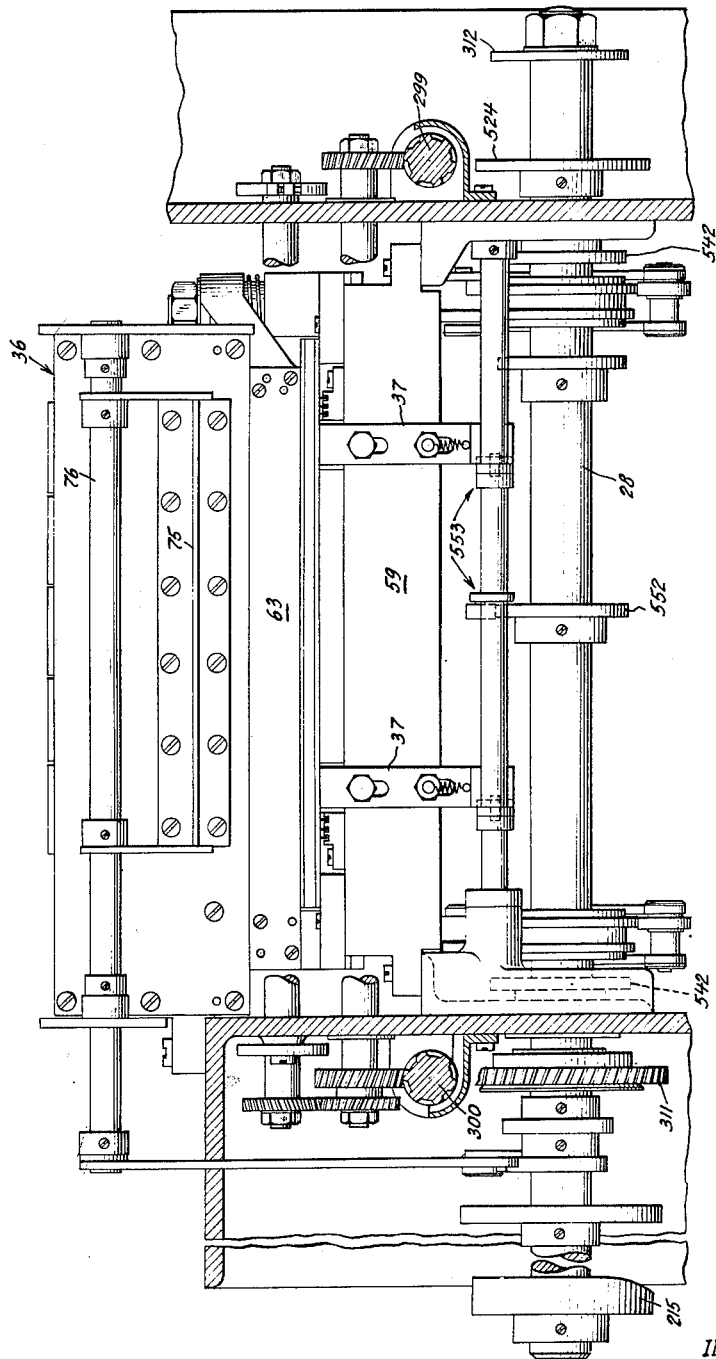

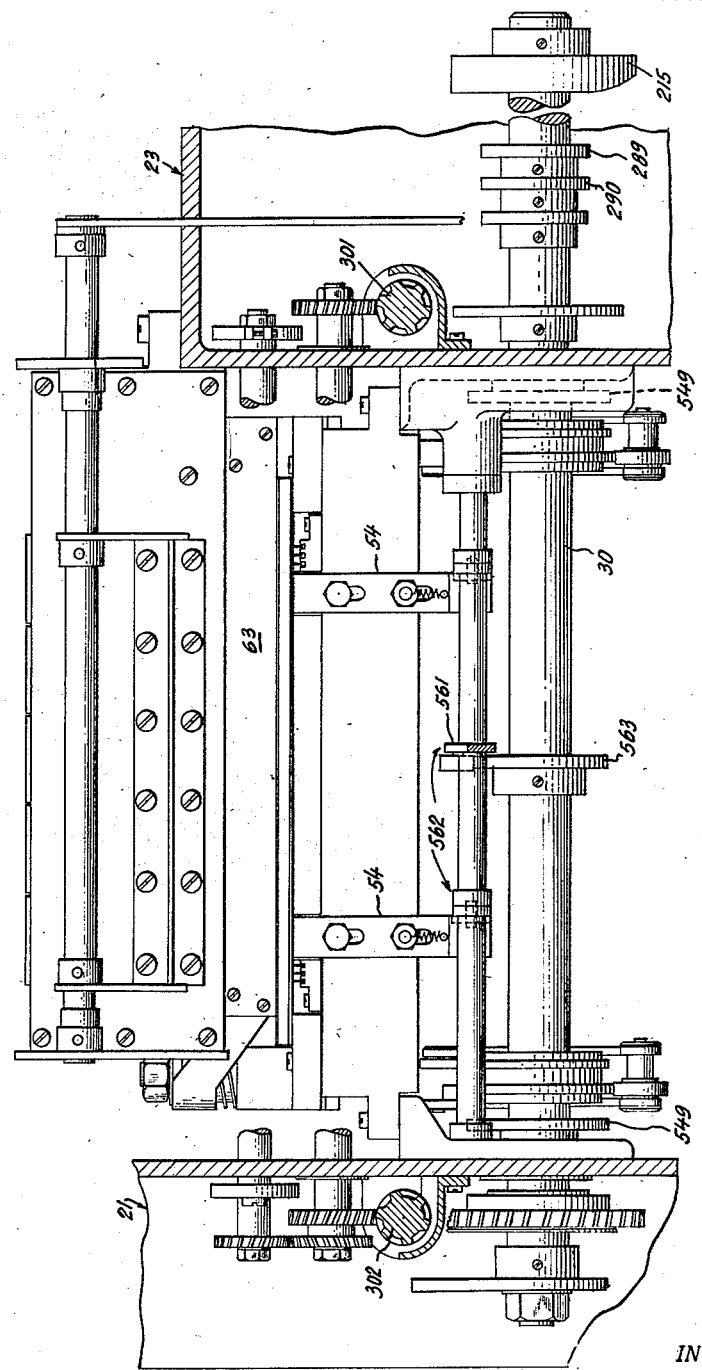

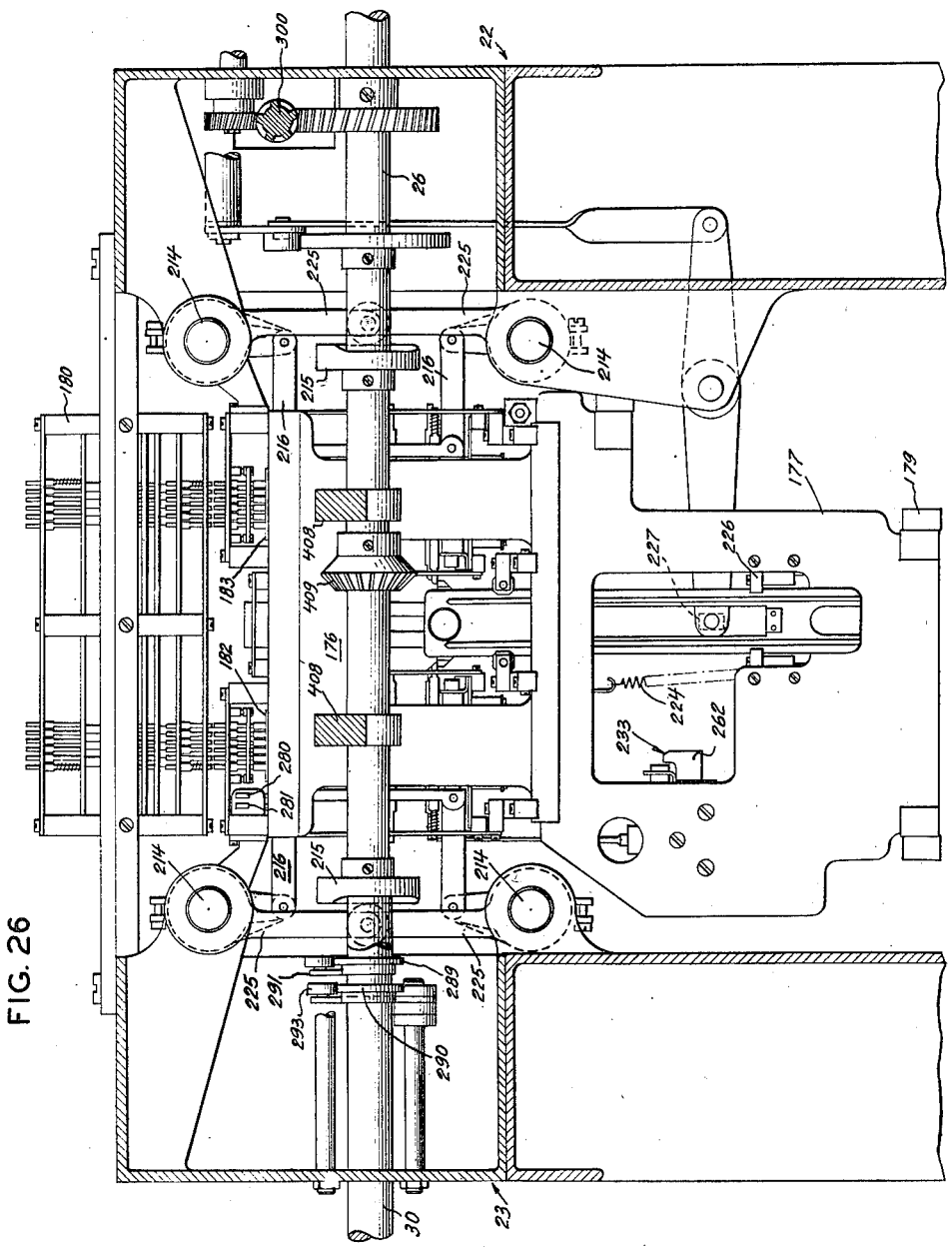

March 15, 1955  J. T. FERRY ET AL  2,704,024
DATA COMPARING AND RECORD POSTING MACHINE
Filed March 16, 1951  35 Sheets-Sheet 22

INVENTORS
JOHN T. FERRY
ERICH H. MOBIUS
JOHN L. STERLING
BY John L Sterling
ATTORNEY March 15, 1955 J. T. FERRY ET AL 2,704,024
DATA COMPARING AND RECORD POSTING MACHINE
Filed March 16, 1951 35 Sheets-Sheet 23

INVENTORS
JOHN T. FERRY
ERICH H. MOBIUS
JOHN L. STERLING
BY John L Sterling
ATTORNEY March 15, 1955  J. T. FERRY ET AL  2,704,024
DATA COMPARING AND RECORD POSTING MACHINE
Filed March 16, 1951  35 Sheets-Sheet 24

INVENTORS
JOHN T. FERRY
ERICH H. MOBIUS
JOHN L. STERLING
BY John L. Sterling
ATTORNEY March 15, 1955     J. T. FERRY ET AL     2,704,024
DATA COMPARING AND RECORD POSTING MACHINE
Filed March 16, 1951     35 Sheets-Sheet 25

INVENTORS
JOHN T. FERRY
ERICH H. MOBIUS
JOHN L. STERLING
BY *J.L. Sterling*
ATTORNEY March 15, 1955   J. T. FERRY ET AL   2,704,024
DATA COMPARING AND RECORD POSTING MACHINE
Filed March 16, 1951   35 Sheets-Sheet 26

INVENTORS.
JOHN T. FERRY
ERICH H. MOBIUS
JOHN L. STERLING
BY John L Sterling
ATTORNEY March 15, 1955  J. T. FERRY ET AL  2,704,024
DATA COMPARING AND RECORD POSTING MACHINE
Filed March 16, 1951  35 Sheets-Sheet 27
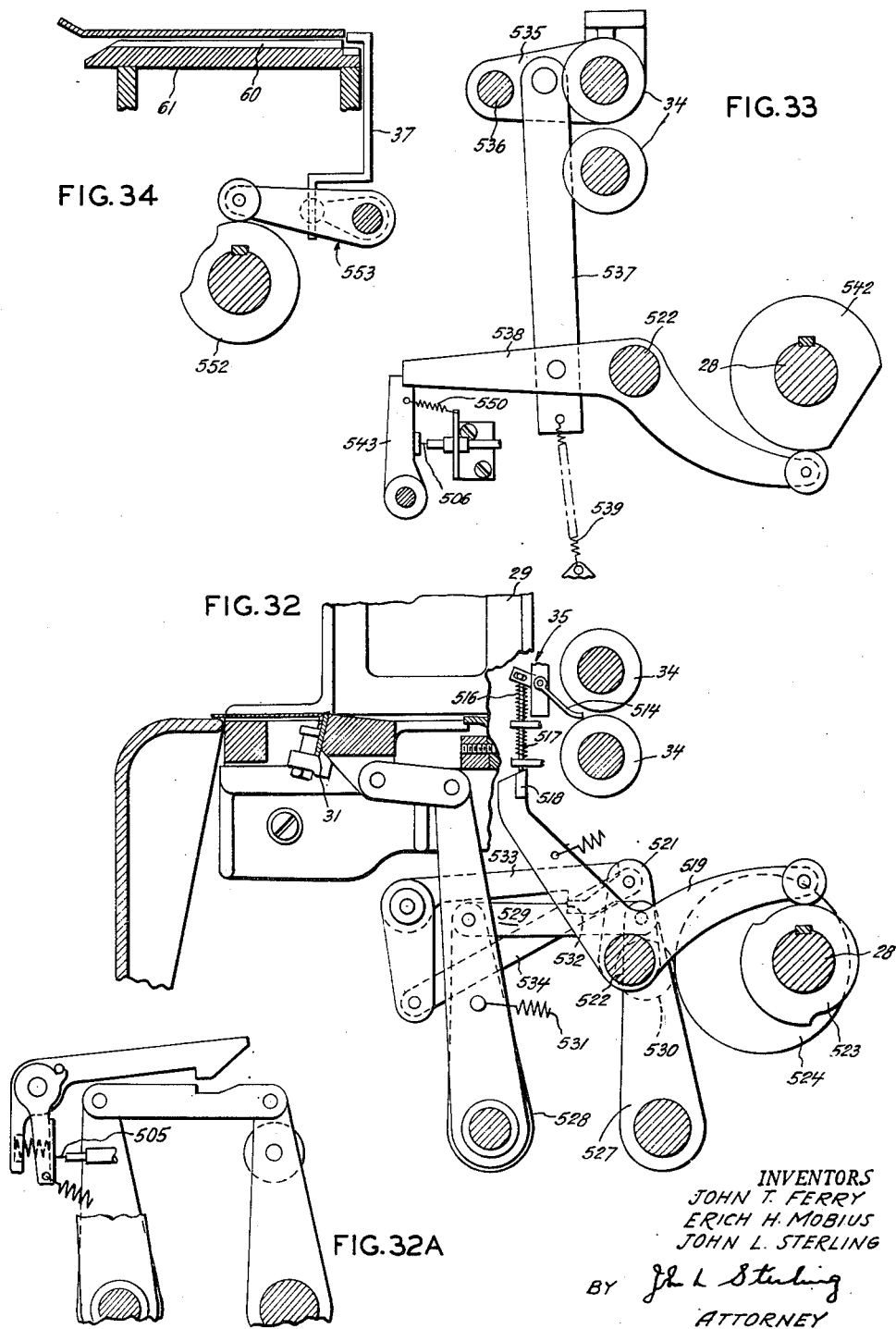
INVENTORS
JOHN T. FERRY
ERICH H. MOBIUS
JOHN L. STERLING
BY John L. Sterling
ATTORNEY

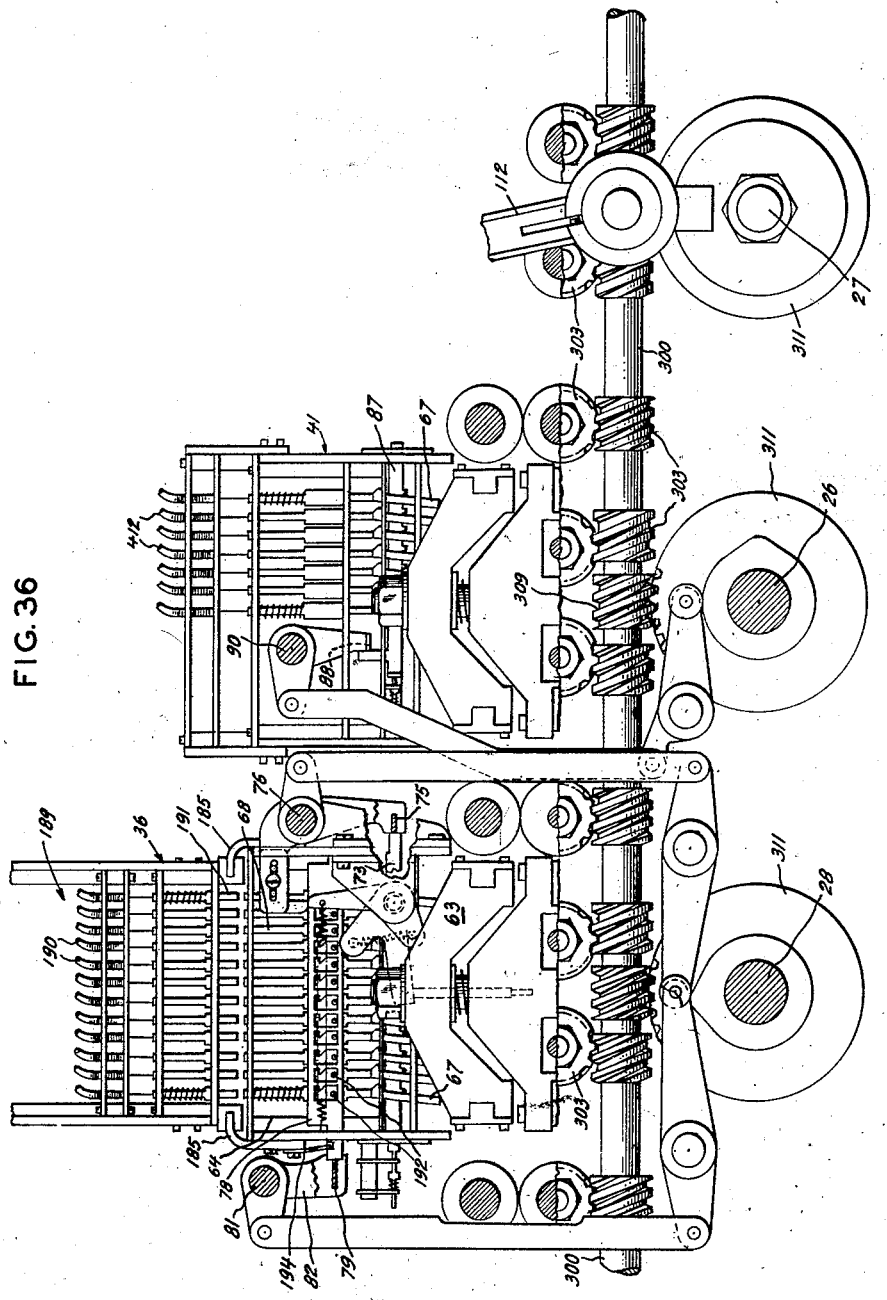

INVENTORS
JOHN T. FERRY
ERICH H. MOBIUS
JOHN L. STERLING
BY John L Sterling
ATTORNEY

United States Patent Office 2,704,024
Patented Mar. 15, 1955

2,704,024

DATA COMPARING AND RECORD POSTING MACHINE

John T. Ferry, South Norwalk, Conn., and John L. Sterling, Bellerose, and Erich H. Mobius, New Hyde Park, N. Y., assignors to Remington Rand Inc., New York, N. Y., a corporation of Delaware Application March 16, 1951, Serial No. 215,946

6 Claims. (Cl. 101—93)

This invention relates to improvements in punched card controlled machines, and in particular to a machine in which data, represented by perforations in one or more cards of different groups, can be printed on single cards corresponding to each group.

It is an important object of the invention, therefore, to provide a machine through which master cards and detail cards can be fed in parallel travel relation, so that master cards, that correspond with one or more detail cards of different groups, may have printed thereon the item or items of said groups.

A further object of the invention is to provide means for determining the comparative relation of the identifling data of the master and detail cards so that the feed of the cards, to and through the stations in the machine, can be automatically controlled.

A still further object of the invention is to provide, in a machine of the character referred to, control means operable, when the identifying data in a master card and in one or more detail cards matches, to selectively operate stops, so that the item data of one or more detail cards can be printed on the matching master card in the correct tabular position with respect to items that have been printed on the master card in a previous run of cards through the machine.

Another object of the invention is to coordinate comparison, print and print stop sensings of the cards so that a minimum number of cycles of machine operation can be used to do the work of feeding the cards, using the comparison sensing to control the initial feeding of the cards, setting up the print stops and printing on the master cards from the related detail cards.

Other objects and structural features of the invention will be apparent from the following description when read in connection with the accompanying drawings, in which:

Fig. 1 is a schematic plan view of the machine showing the relation of the various mechanisms;

Figure 2:
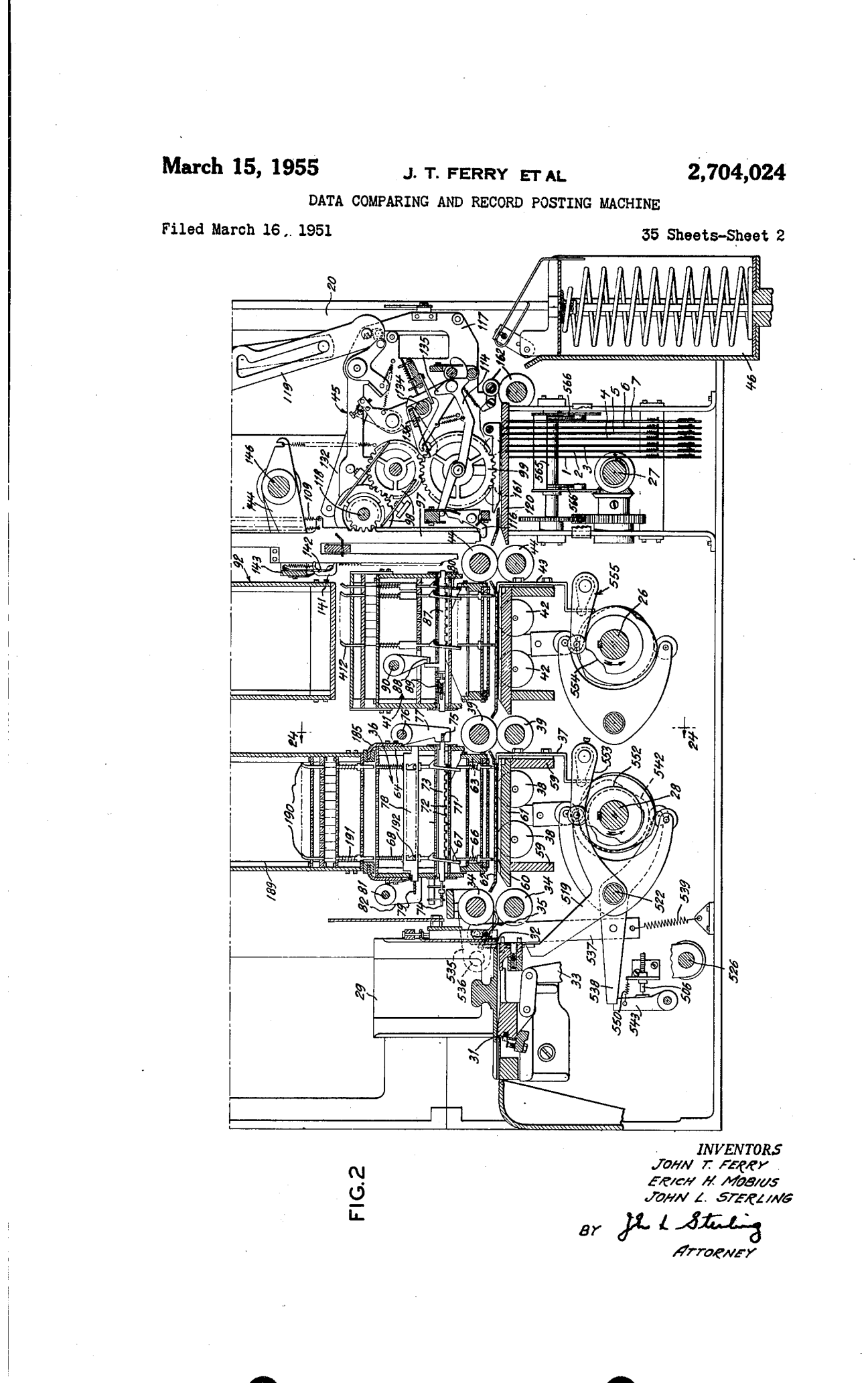

Figs. 2 and 2A combine to form a sectional elevation, taken on line 2—2 of Fig. 1, showing the master side of the machine;

Figs. 3 and 3A combine to form a sectional elevation, taken on line 3—3 of Fig. 1, showing the detector and control units;

Fig. 4 is a sectional elevation taken through the machine along line 4—4 of Fig. 1, showing the detail presensing and print sensing mechanisms;

Figure 1:
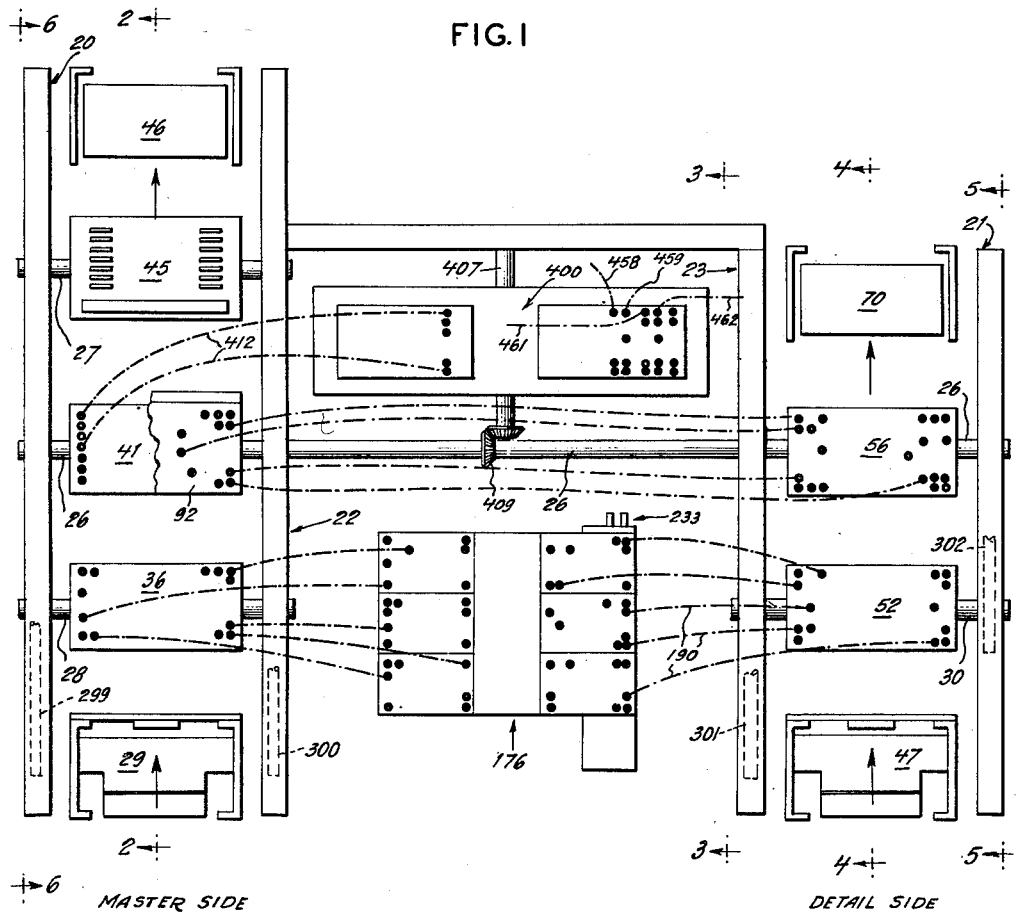
Figure 5:
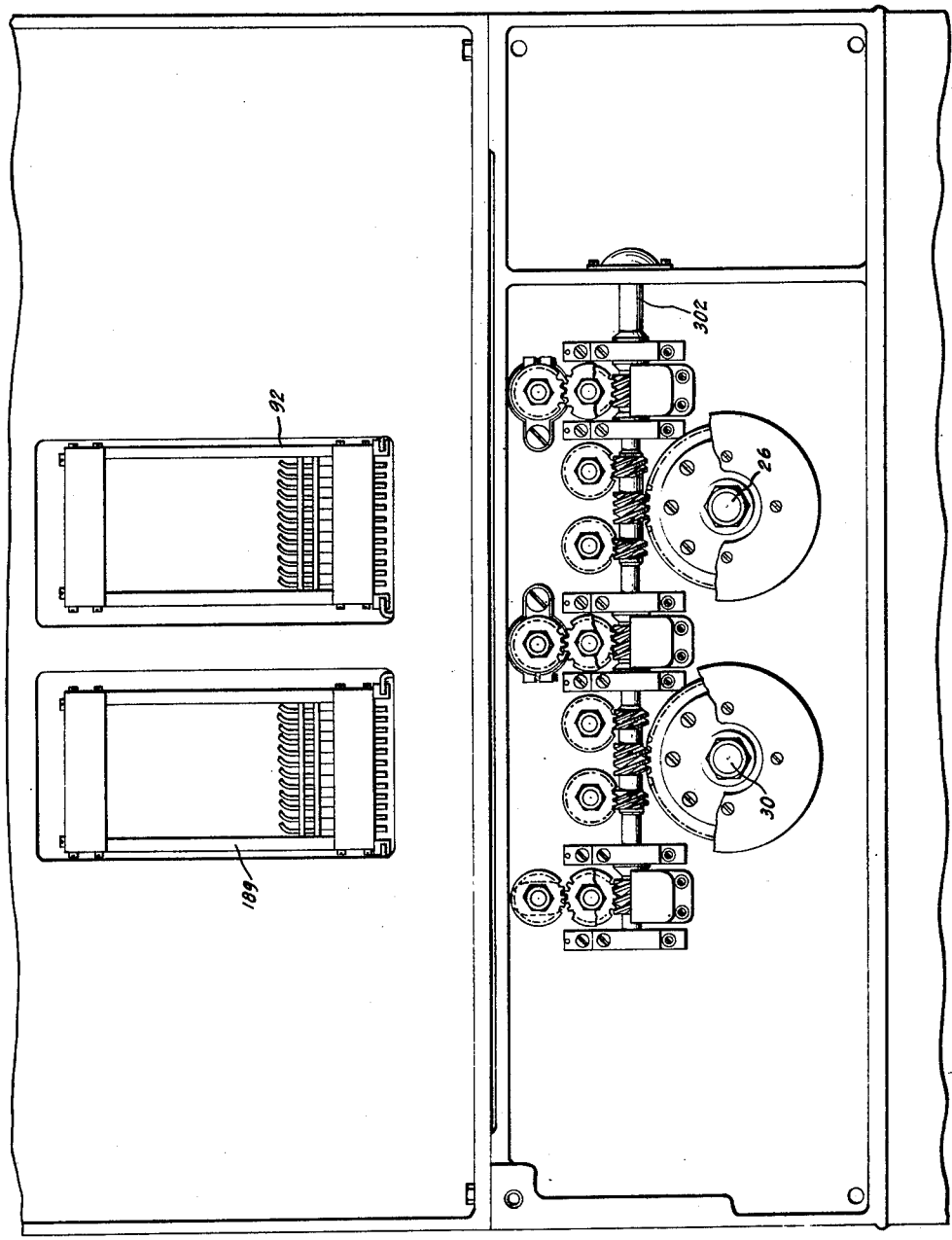
Fig. 5 is a view in elevation, taken on the line 5—5 of Fig. 1, showing the driving mechanism at the detail side of the machine.
Figure 7:
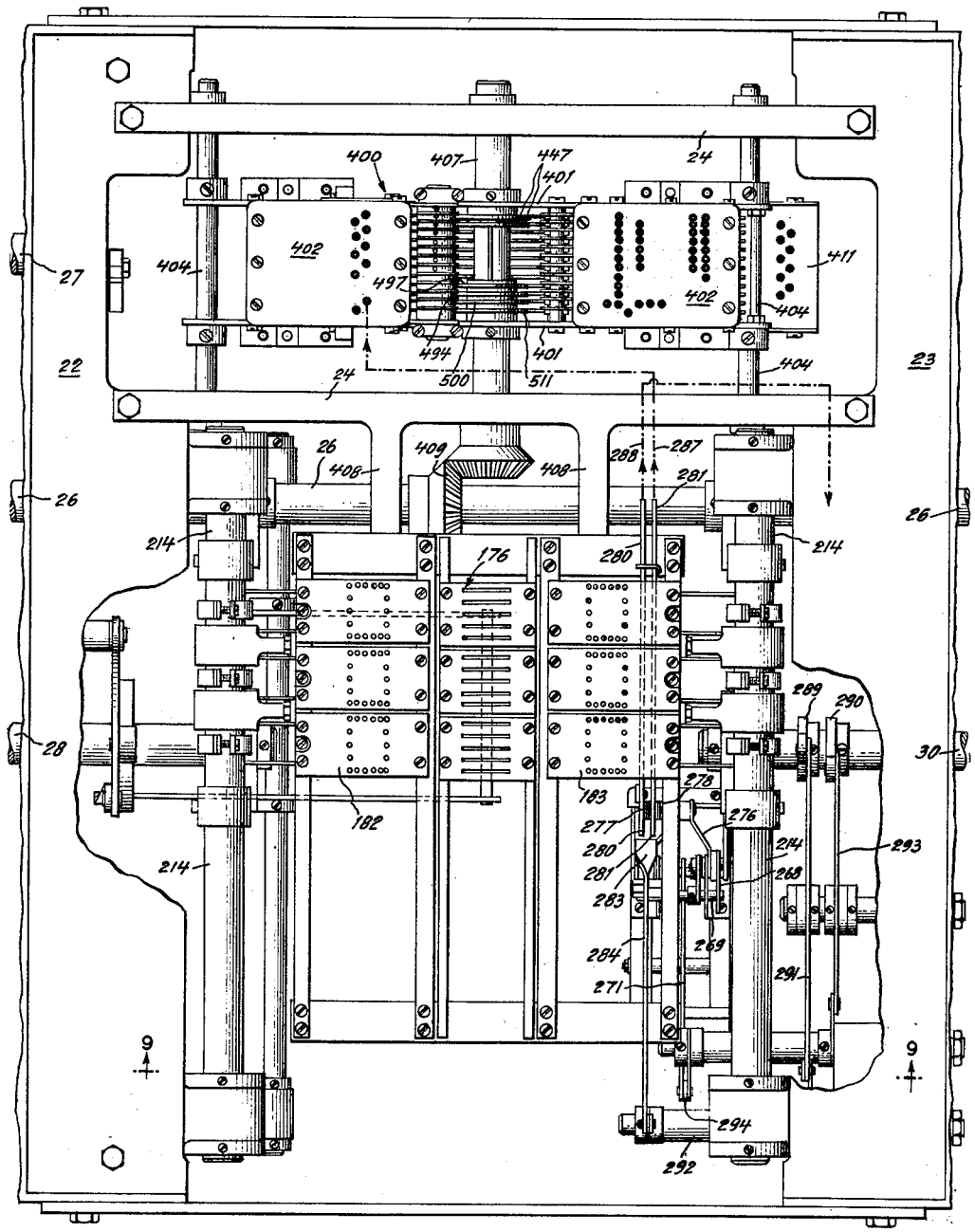
Figure 8:
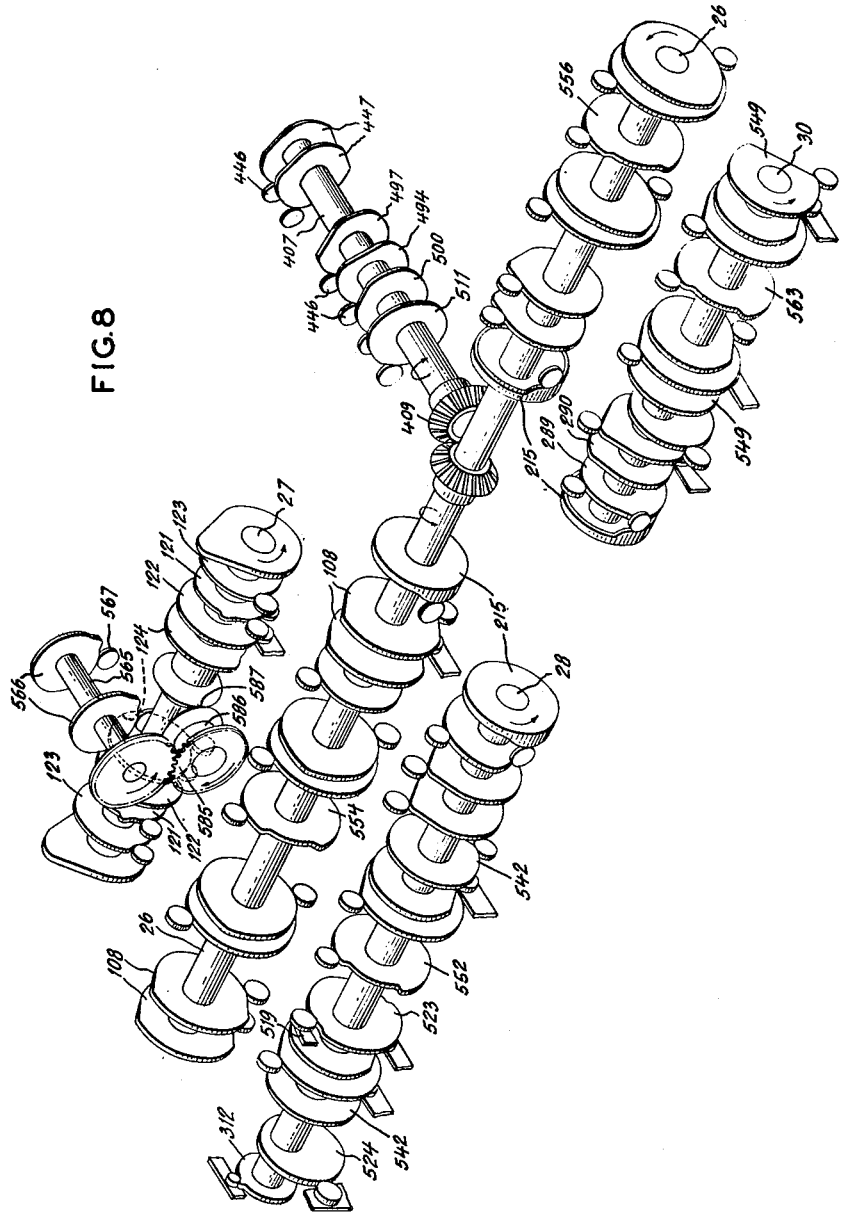
Figure 9:
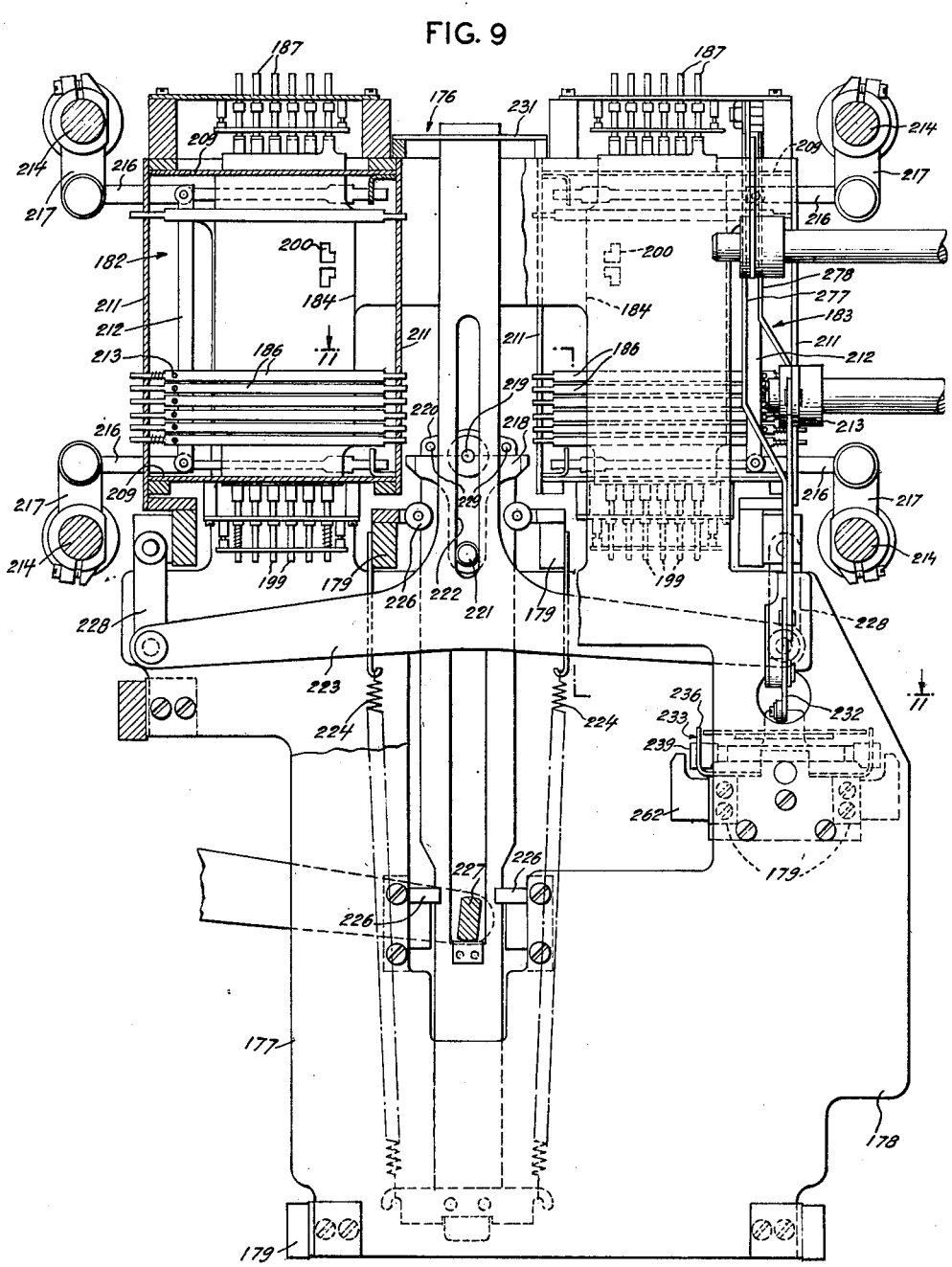
Figure 10:
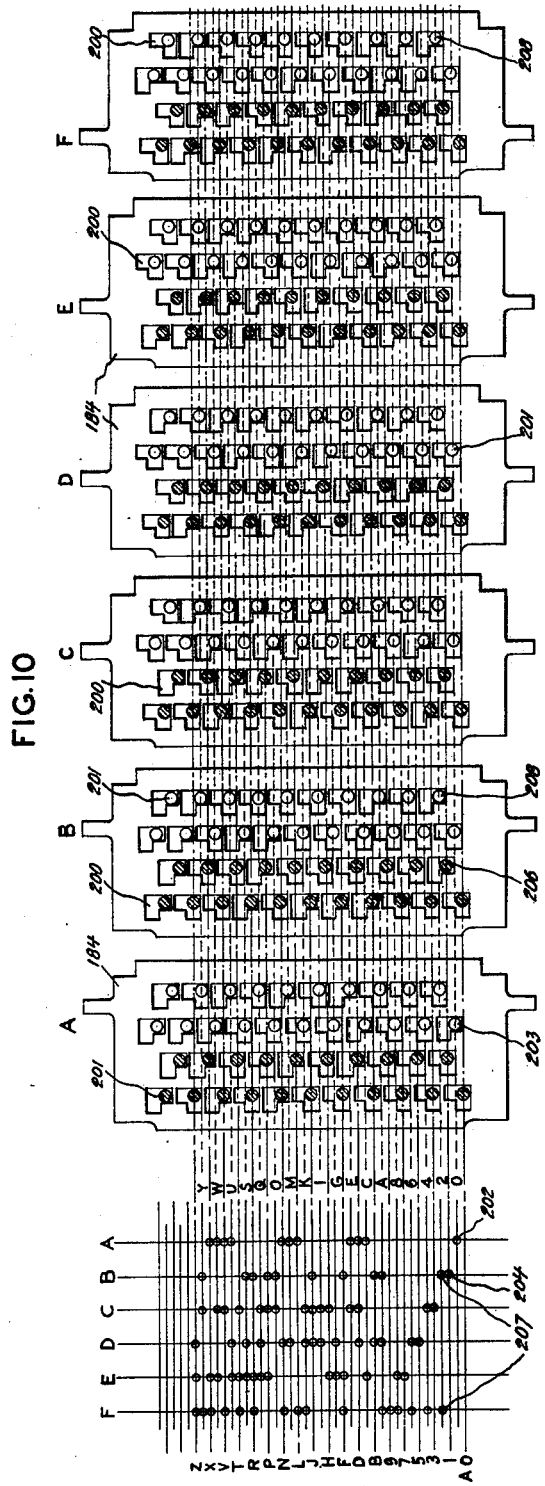
Figure 11:
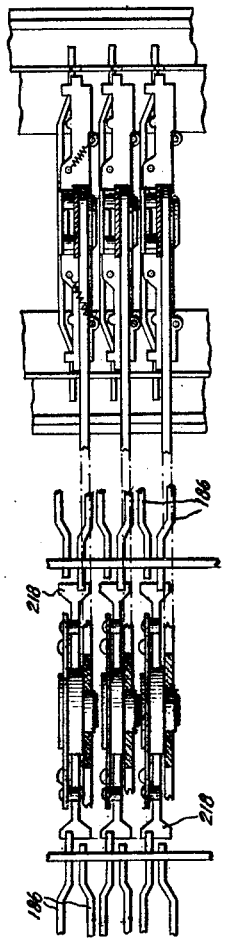
Figure 23:
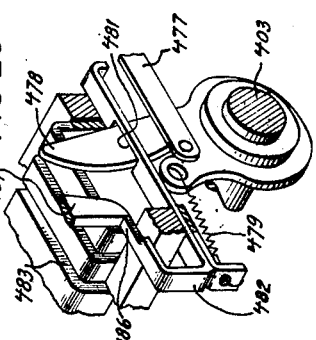
Figure 14:
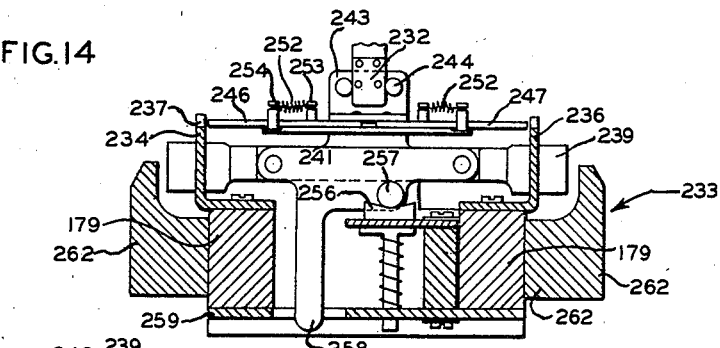
Figure 15:
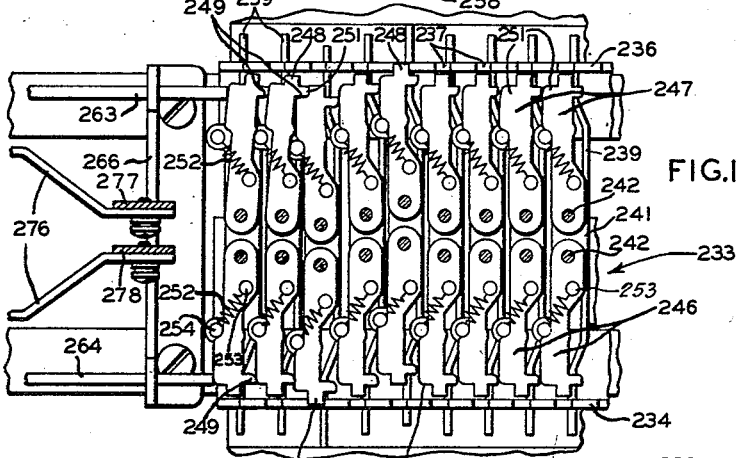
Figure 16:
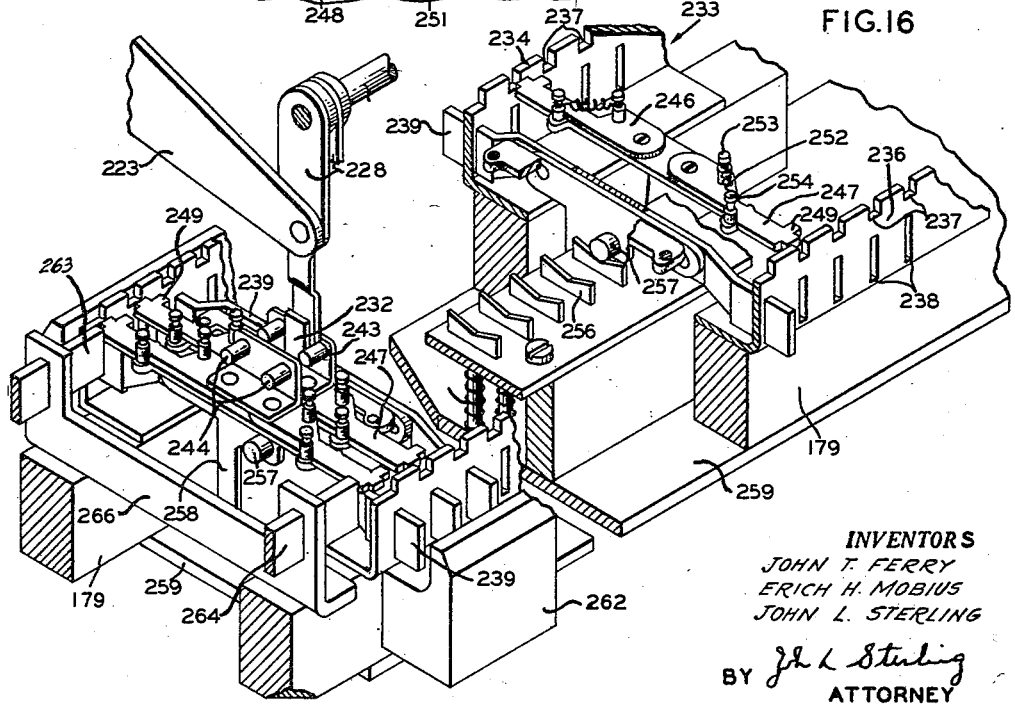
Figure 27:
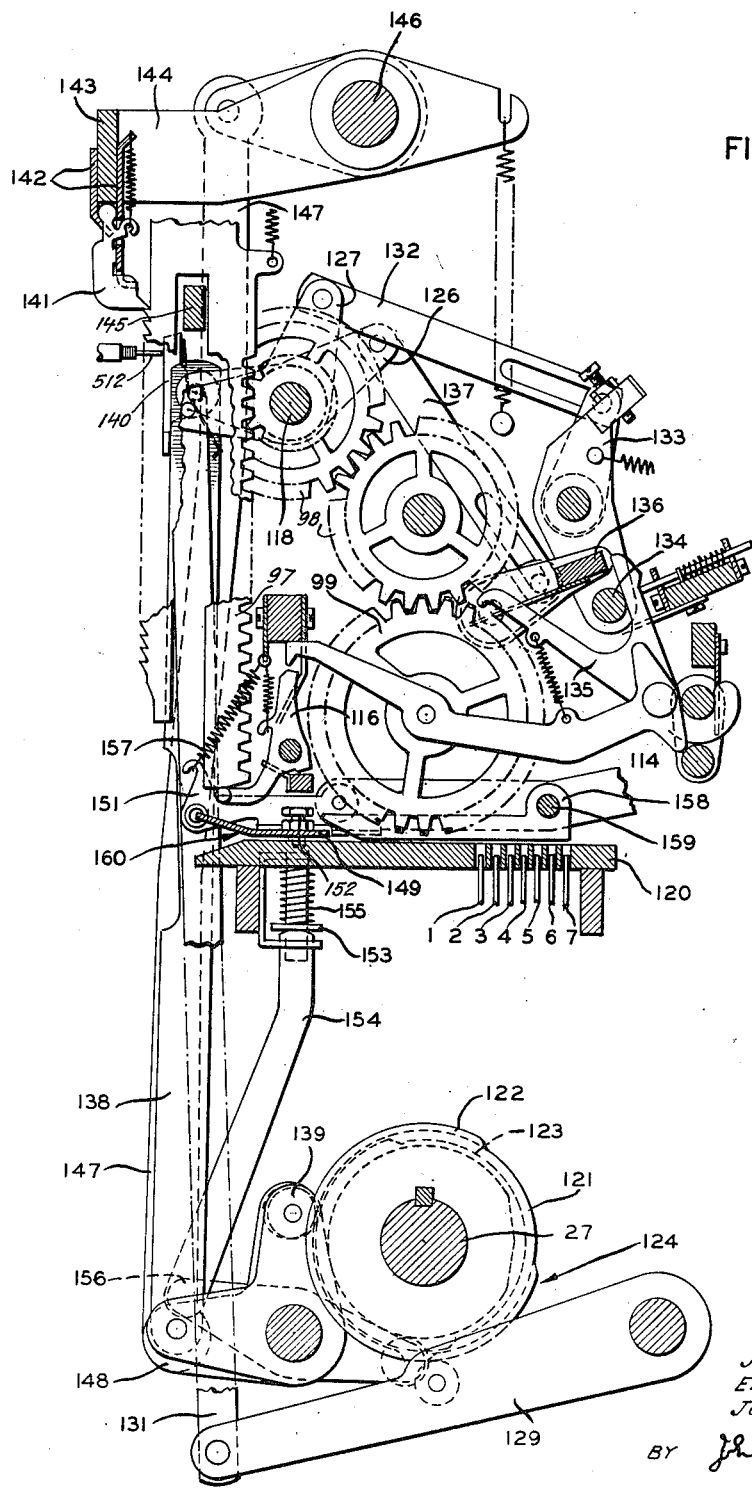
Figure 38:
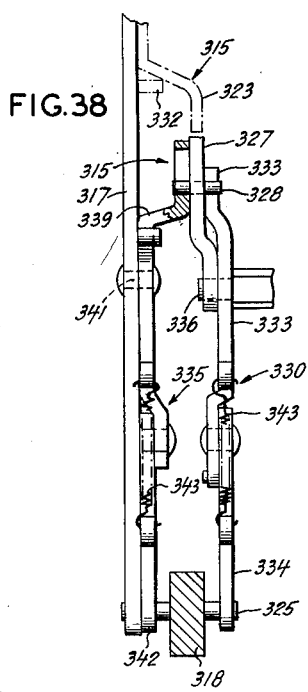
Figure 37:
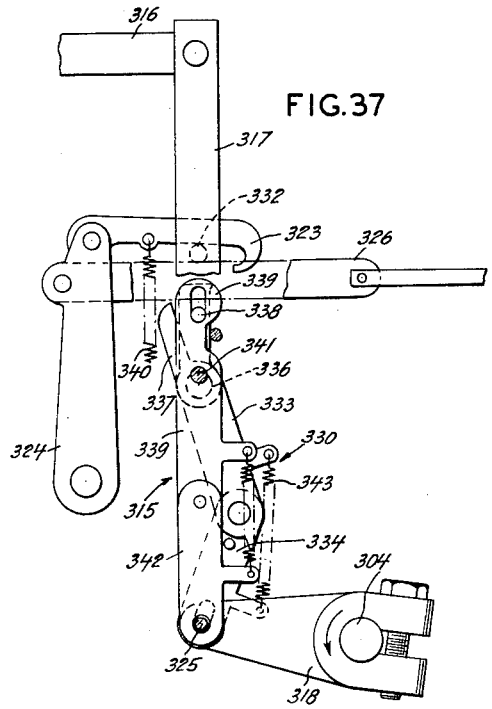
Figure 39:
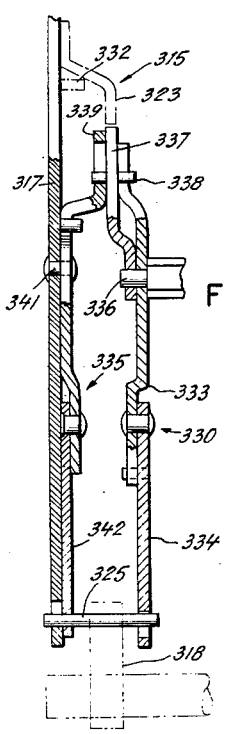
Figure 28:
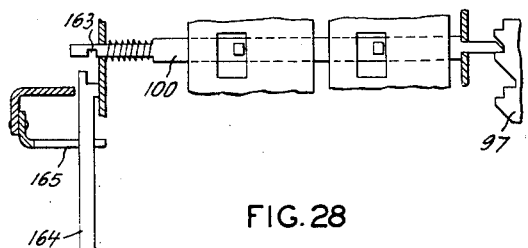
Figure 29:
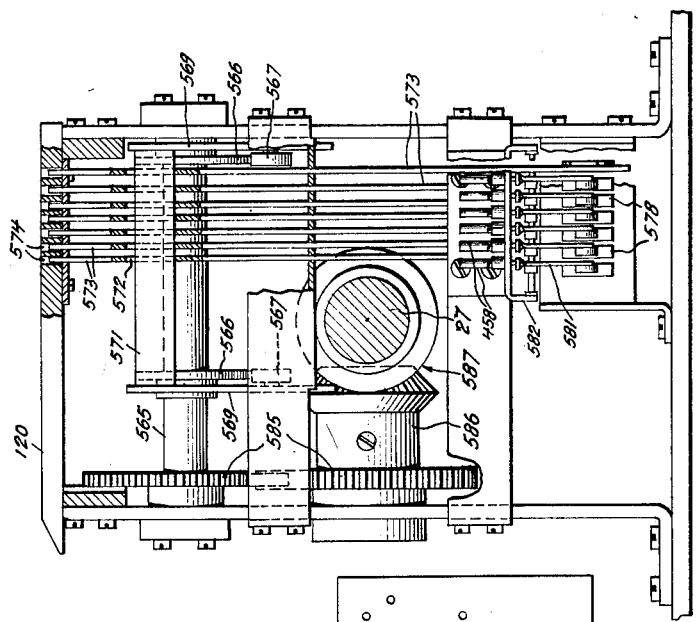
Figure 35:
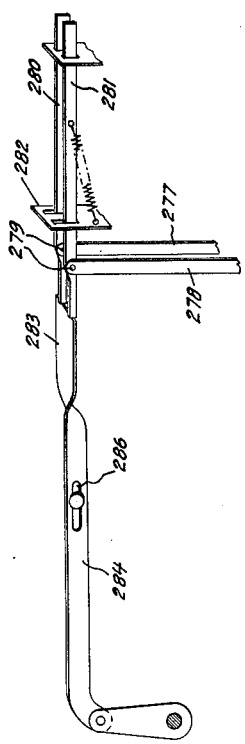
Figure 40:
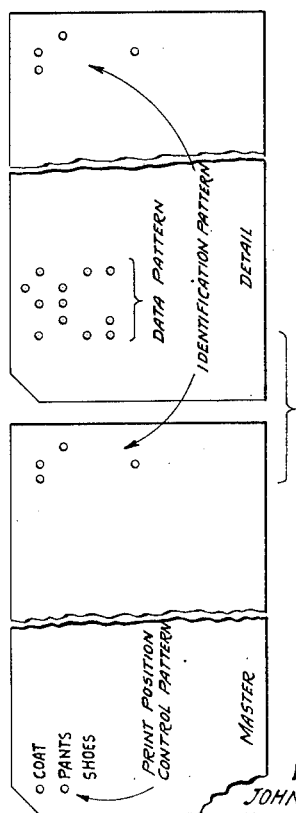
Figure 30:
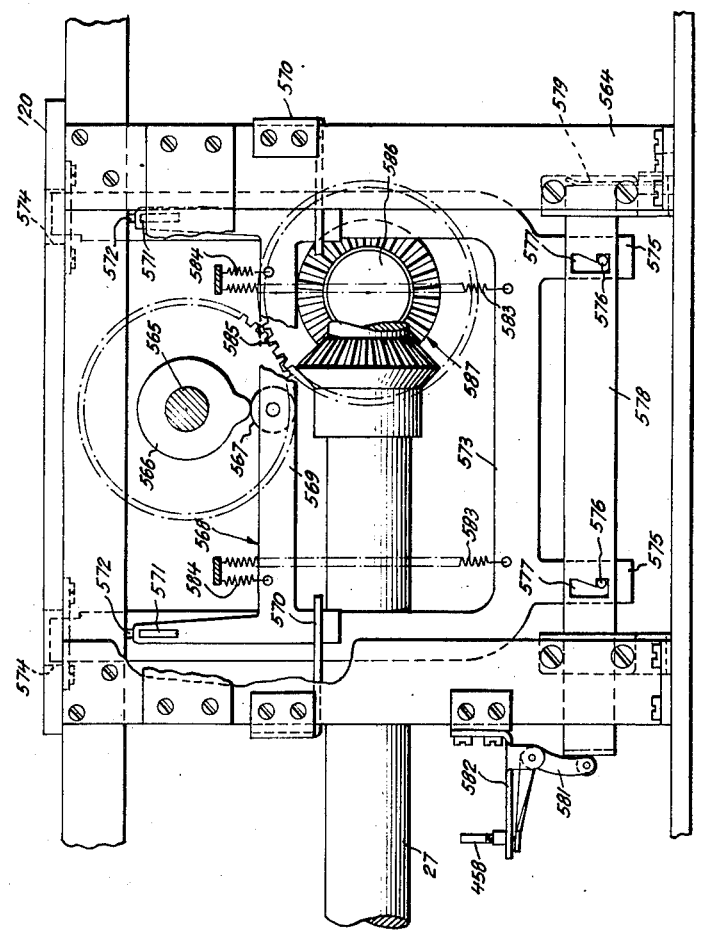
Figure 31:
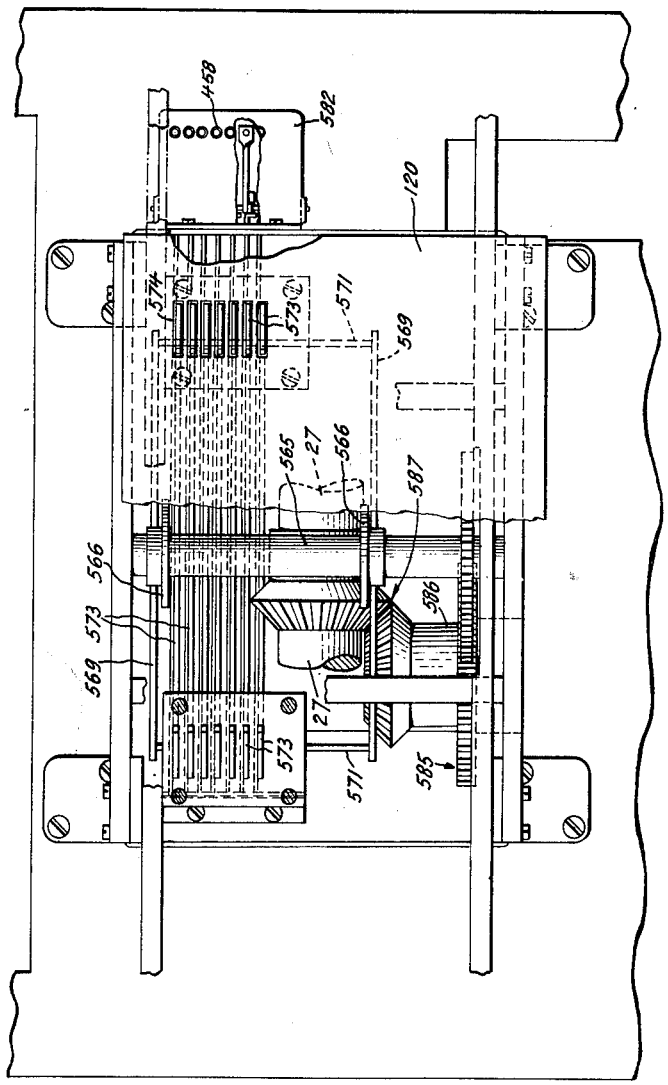
Figure 41:
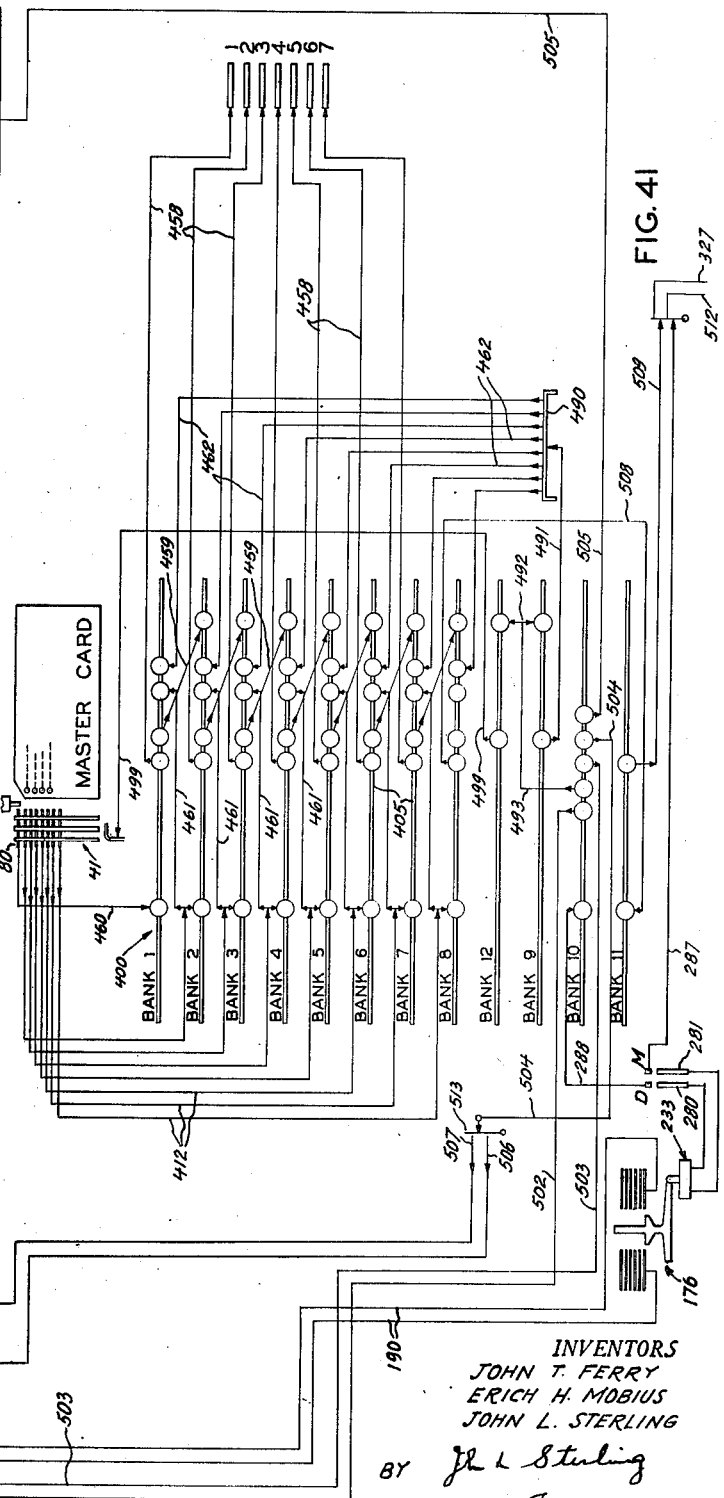
Figure 42:
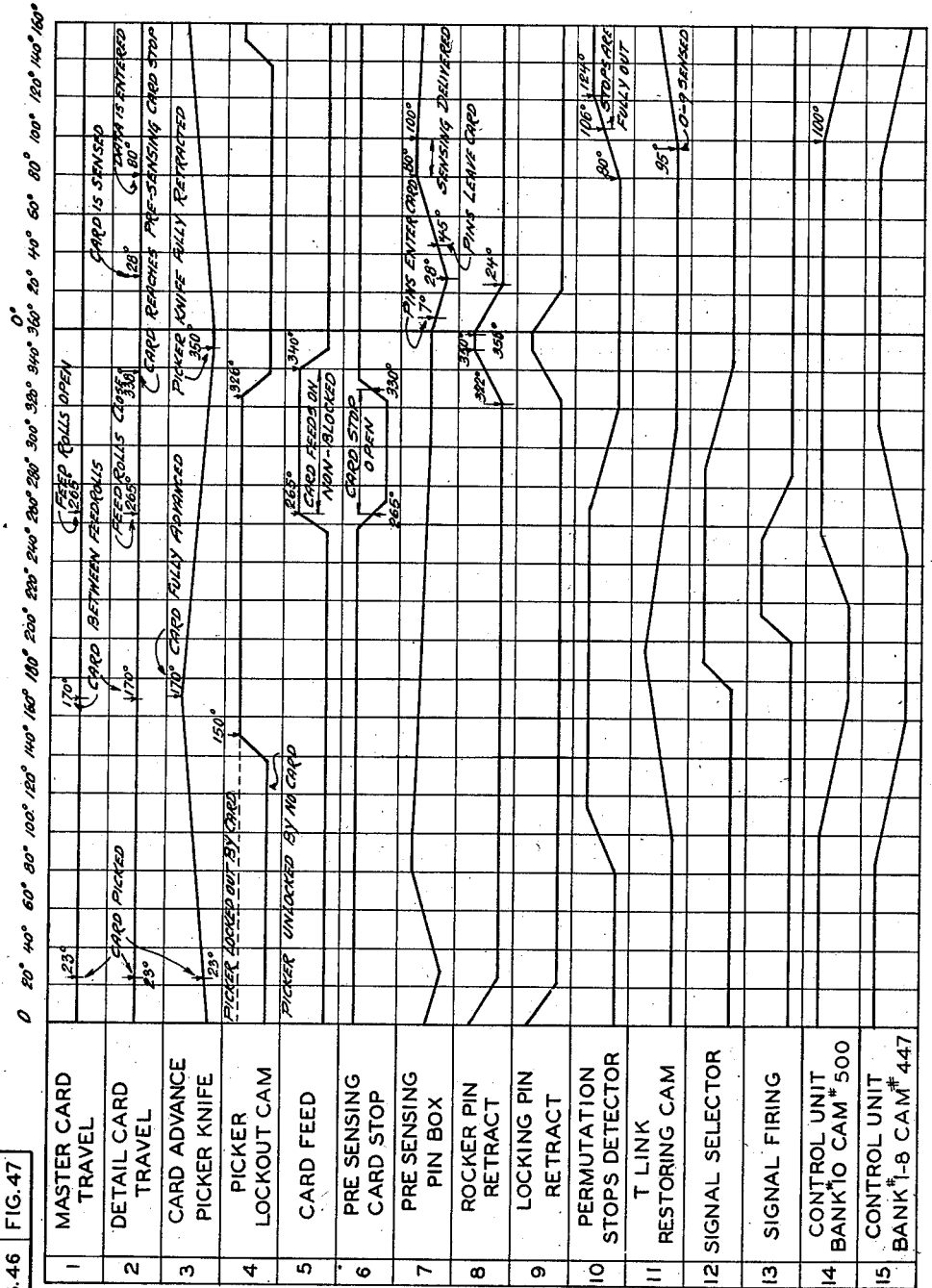
Figure 43:
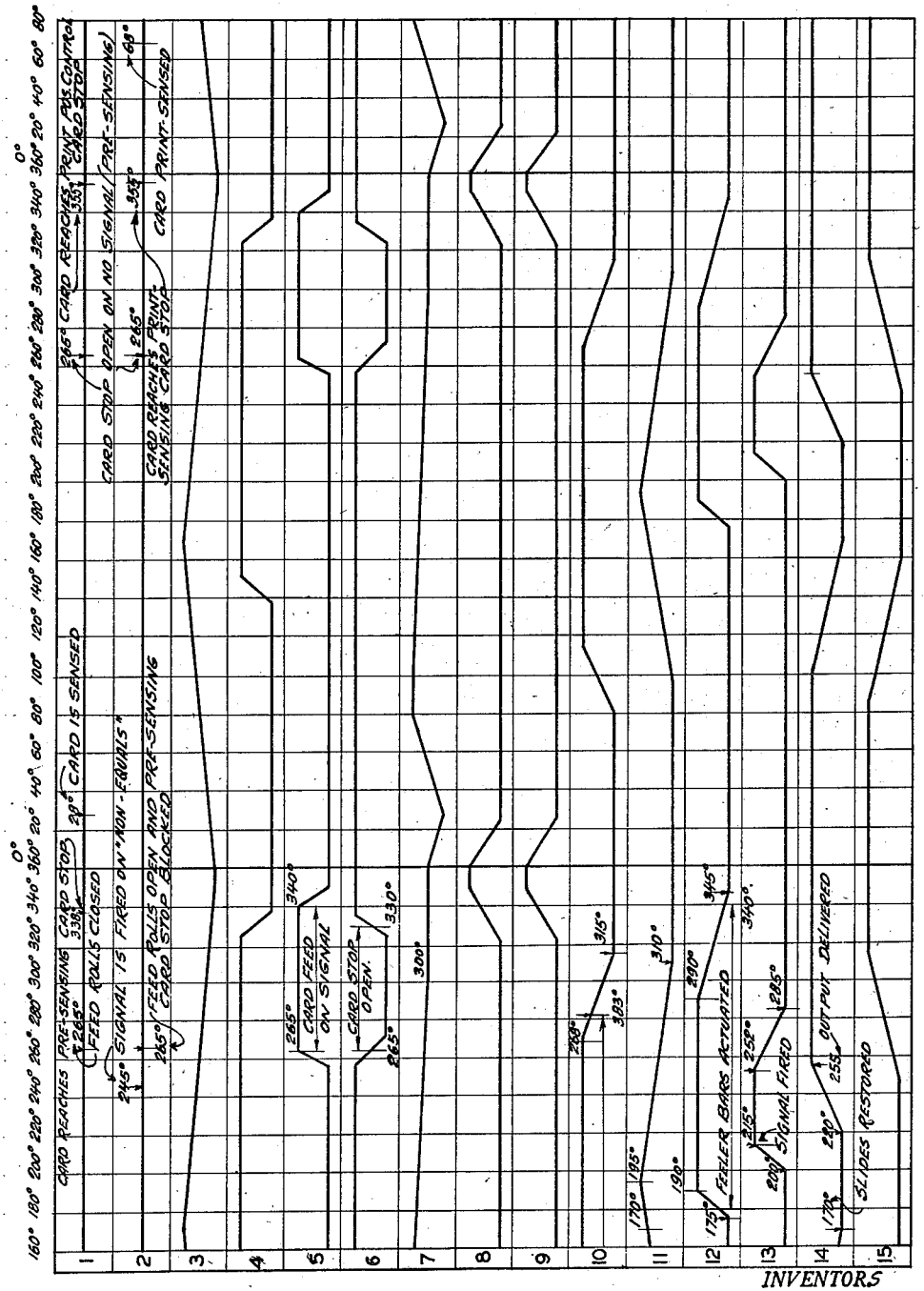
Figure 44:
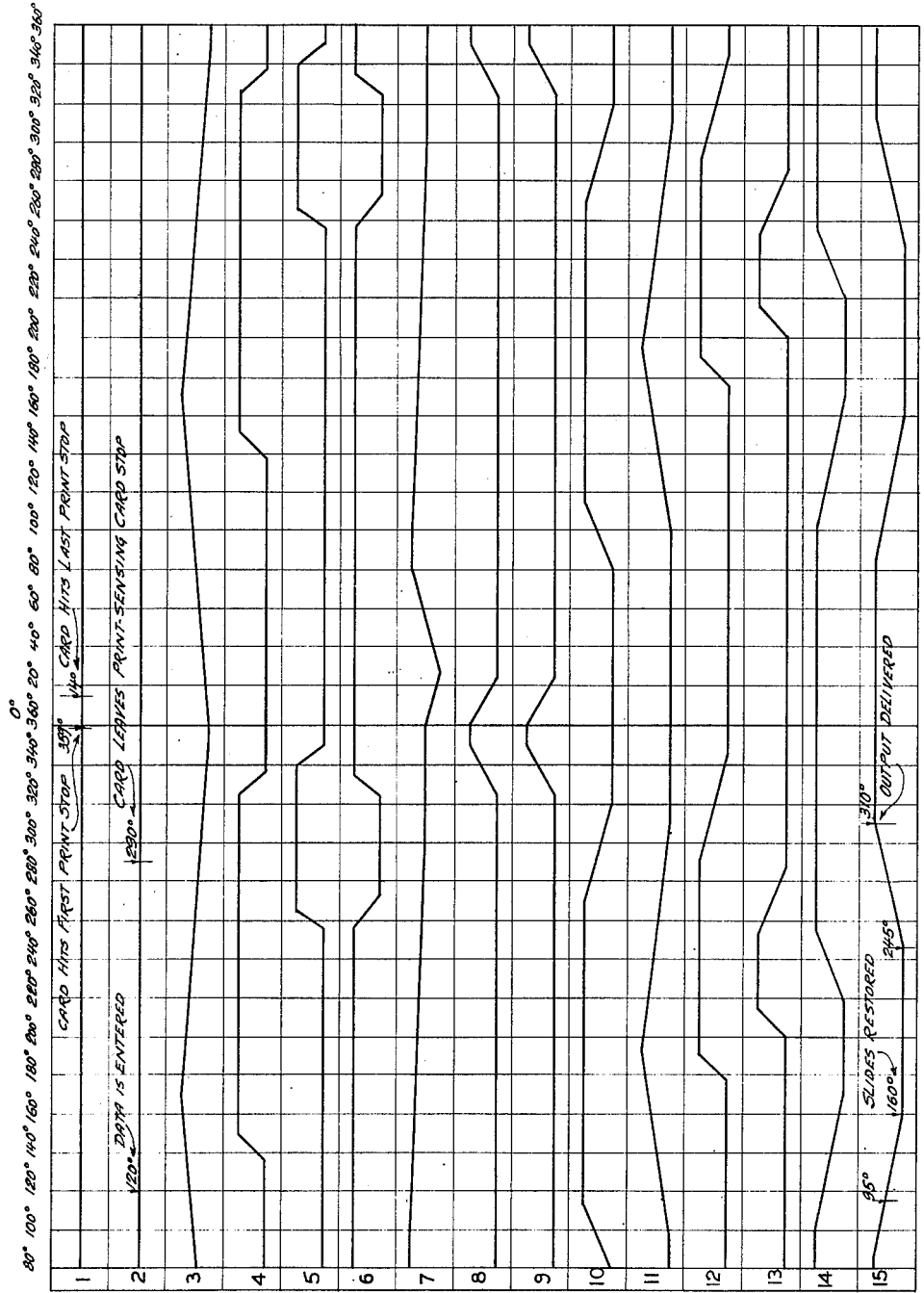
Figure 45:
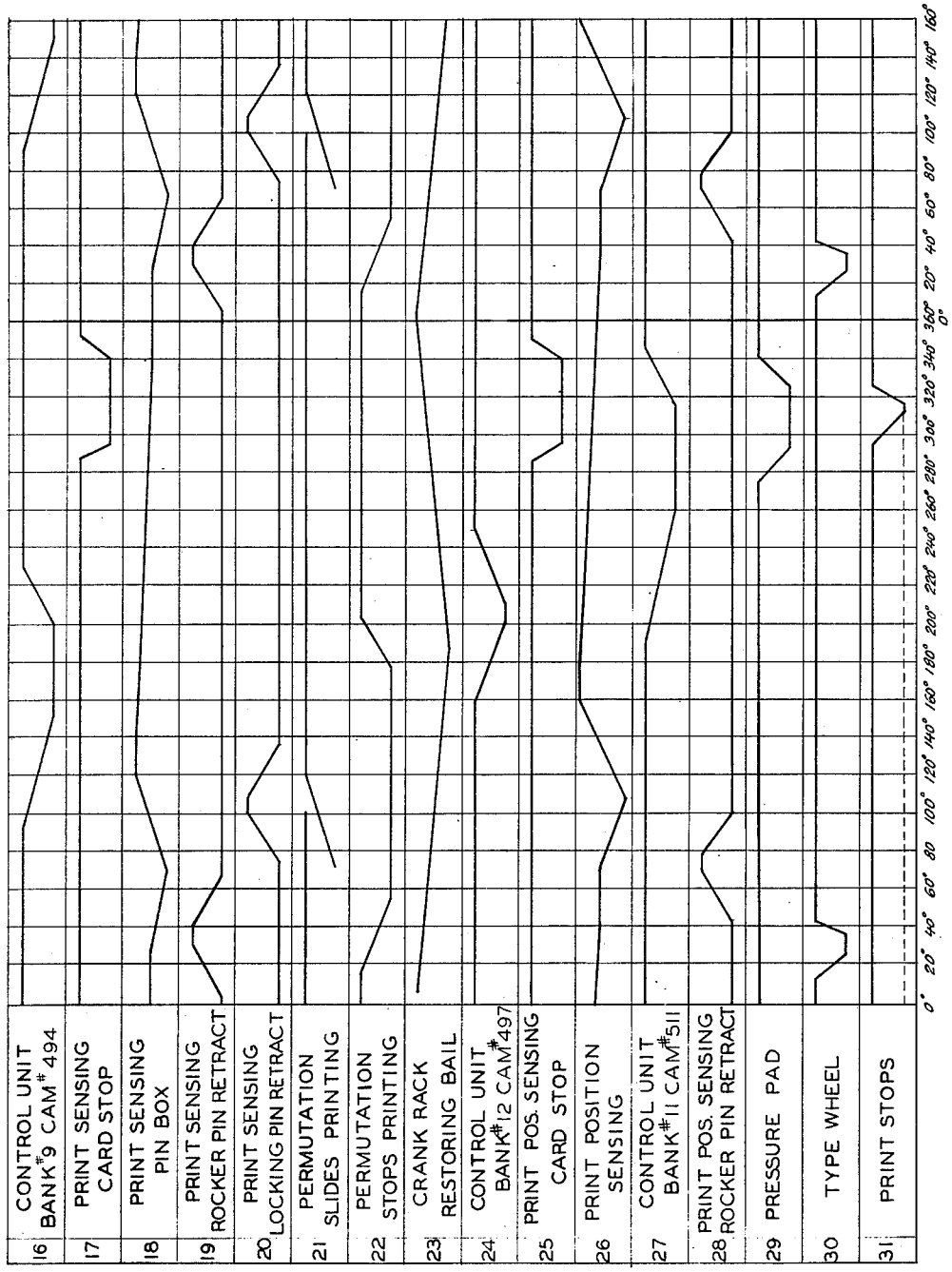
Figure 46:
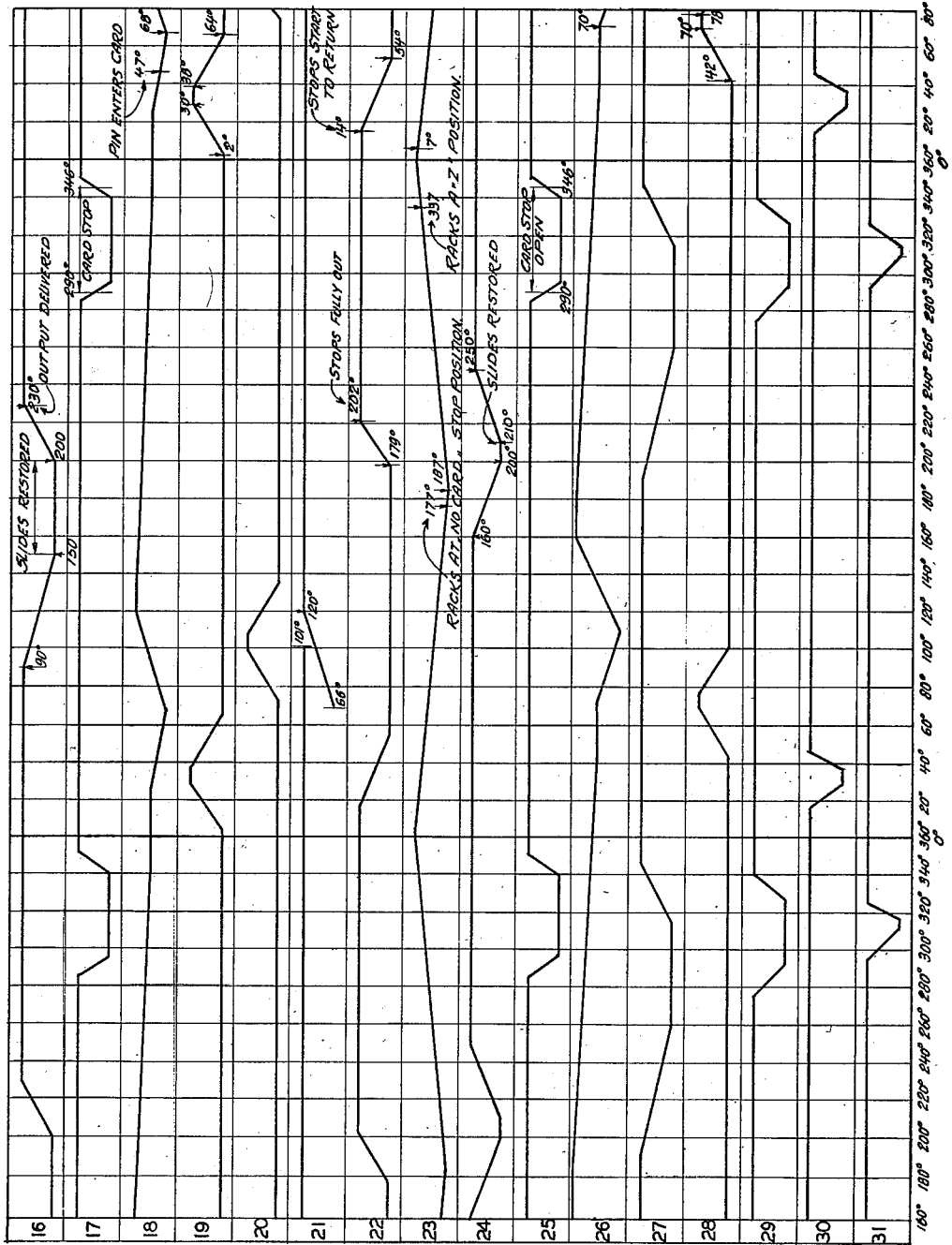
Figure 47:
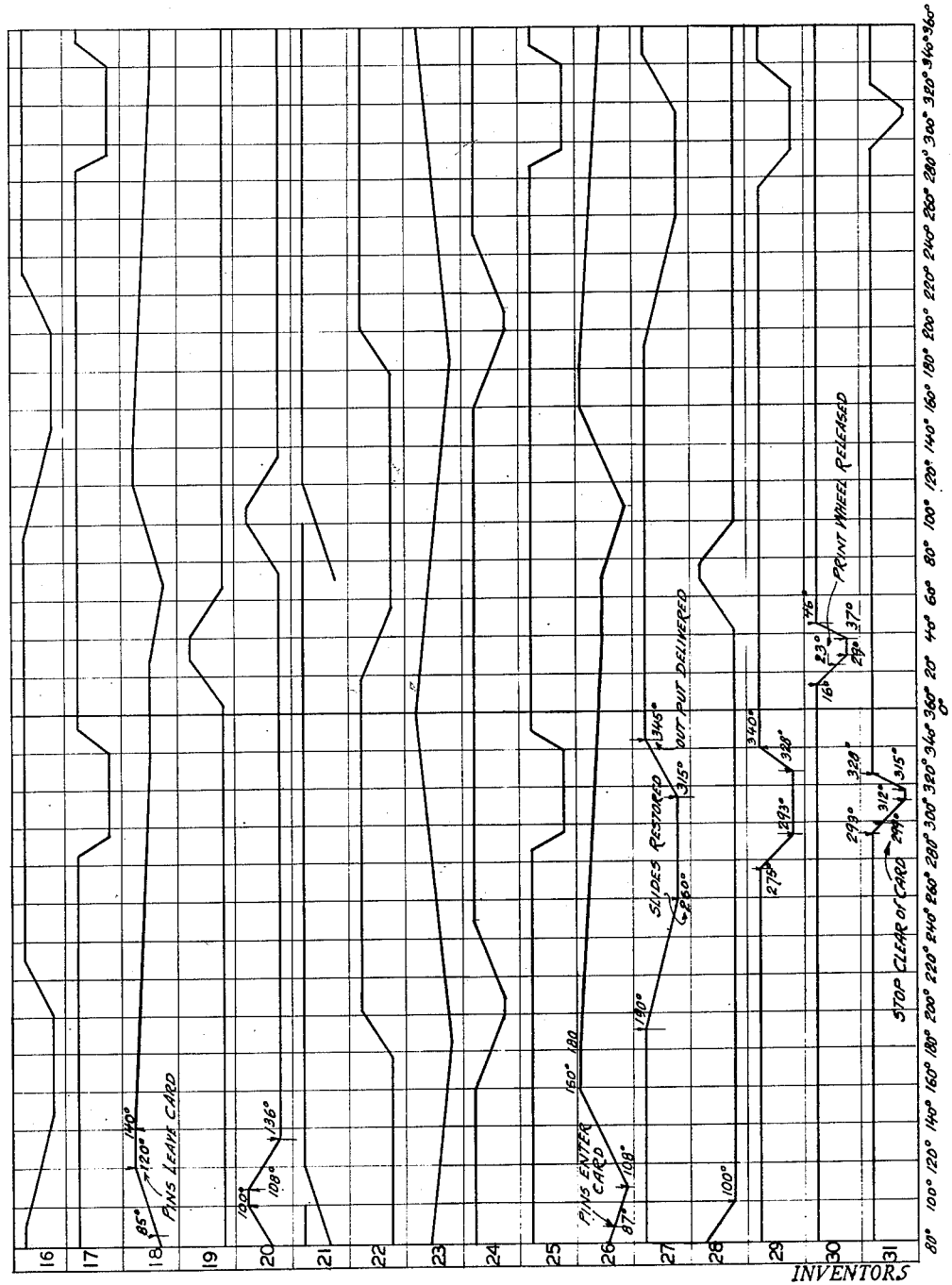

Figs. 6 and 6A combine to form a view in elevation, taken on the line 6—6 of Fig. 1, showing the driving and control mechanisms at the master side of the machine;

Fig. 7 is a plan view, on line 7—7 of Fig. 3, showing the detector and control units;

Fig. 8 is a view in perspective of the cam arrangement for controllling the various mechanisms;

Fig. 9 is a vertical section through the mid-portion of the machine, taken approximately on line 9—9 of Fig. 7, showing the data comparing and signal selector units;

Fig. 10 is a schematic layout of the code plates used in the data comparing unit;

Fig. 11 is an enlarged sectional detail taken on the line 11—11 of Fig. 9;

Fig. 12 is a plan view of the tumbler arrangement in the signal selector unit;

Fig. 13 is a side view of the tumbler box shown in Fig. 12;

Fig. 14 is a section taken on the line 14—14 of Fig. 13;

Fig. 15 is a plan view of part of the mechanism shown in Fig. 12 in one position of operation;

Fig. 16 is a view in perspective of the mechanism of Fig. 12 with parts broken away to show the structure;

Fig. 17 is a sectional view in elevation taken through the control unit showing the structure of bank #1;

Fig. 18 is a view similar to Fig. 17 showing the structure of banks #2, #3, #4, #5, #6, #7 and #8;

Fig. 19 is a view similar to Fig. 17 showing the structure of bank #9;

Fig. 20 is a view similar to Fig. 17 showing the structure of bank #10;

Fig. 21 is a view similar to Fig. 17 showing the structure of bank #11;

Fig. 22 is a view similar to Fig. 17 showing the structure of bank #12;

Fig. 23 is a view in perspective of a lower input signal mechanism used in some banks of the control unit;

Fig. 24 is a vertical section on line 24—24 of Fig. 2 showing the master card presensing mechanism;

Fig. 25 is a vertical section taken on the line 25—25 of Fig. 4 showing the detail card presensing mechanism;

Fig. 26 is a vertical section taken on the line 26—26 of Fig. 3 looking from the rear toward the data comparing unit;

Fig. 27 is a view in sectional elevation through the printing mechanism;

Fig. 28 is a view in side elevation of a printing lockout device;

Fig. 29 is a view in side elevation of the print stop mechanism;

Fig. 30 is a rear view in elevation of the stop mechanism shown in Fig. 29;

Fig. 31 is a plan view of the stop mechanism shown in Fig. 30;

Fig. 32 is a view in side elevation of a "no-card" detector mechanism;

Fig. 32A shows the detail card picker detent;

Fig. 33 is a view of the master magazine feed roll control isolated from other mechanisms;

Fig. 34 is a side view of a representative card stop mechanism;

Fig. 35 is a fragmentary view in isometric showing parts of the signal selector mechanism;

Fig. 36 is a view in side elevation of the retract controls in the master sensing mechanisms;

Fig. 37 is a detail side view of a machine stop toggle mechanism;

Fig. 38 is an edge view of the mechanisms illustrated in Fig. 37;

Fig. 39 is a view in sectional elevation through the mechanism shown in Fig. 38 illustrating the parts in machine "stop" position;

Fig. 40 is a schematic illustration of a master and a detail card;

Fig. 41 is a schematic illustration showing the operational controls and the progress of the cards;

Figs. 42 to 47, inclusive, combine to provide a timing chart of machine operation; and Fig. 48 is a layout showing the relative arrangement of the figures of the timing chart.

In order that the description of the invention may be followed to better advantage, an example of one use of the machine will be described in the handling of data in a mercantile establishment, but it is understood that the invention may, with equal facility, have many other business uses.

A general index file of master cards is used to provide a convenient record of the purchases made by each customer. Each master card has punched therein account number and customer identification, designating perforations. For every purchase made by a customer a separate detail card is punched with perforations designating the item bought as well as the account number corresponding to the account number in the master card kept for that customer. In the master and detail cards the spatial arrangement of perforations may be divided into selected patterns which, for convenience are referred to as "identification pattern," "data pattern" and "control pattern." Periodically, the master cards and the detail cards of all customers, after being arranged in the order of their account numbers or "identification pattern" perforations are placed in separate magazines of the present machine and fed through the machine in parallel paths of travel so that each of the master cards can have printed thereon, in consecutive order, the individual items represented by the "data pattern" perforations of one or more of each of the detail cards whose account numbers correspond with the account numbers of said master cards. During the time between these periodic printings some customers may not make purchases and from the index file some master cards may be removed. As the cards pass through the machine the account numbers or "identification pattern" perforations punched in the master and detail cards are sensed and compared and as a result of agreement or difference thereof, the feed of the master and the detail cards through the machine, as well as the printing on the master card and certain other machine functions, are automatically controlled.

The machine, in its general organization, has a "master" side and a "detail" side arranged to provide parallel paths for card travel including stations through which the cards pass from card supply magazines to eject pockets in progressive cycles of machine operation. Inasmuch as some of the mechanisms at the different master and detail stations are substantially similar, a description of one will suffice and to this end, reference is made to the U. S. Patents to W. W. Lasker, 2,323,816; S. Alvine, 2,151,177; R. W. Ritzert, No. 2,311,471; K. J. Braun et al., 2,387,828; and the British Patent to Arthur Thomas, No. 401,012, for an understanding of the card sensing and card printing mechanisms herein employed. The card sensing mechanisms are basically similar to the sensing mechanisms disclosed in the U. S. Patent No. 2,387,828 and in the British patent; while the printing mechanism is, in essence, similar to the one shown in the U. S. Patent No. 2,311,471.

Referring to the drawings in detail, the master and detail sections of the machine (Figs. 1, 2 and 3) are defined by outer sectional side frames 20, 21 and intermediate sectional side frames 22, 23 connected by suitable brackets 24 and plates 25 for the support of the working parts of the machine and the joining together of the section to form a unitary structure in which is laterally journalled a counter cam shaft 26 and associated auxiliary cam shafts 27, 28 and 30 arranged parallel to said counter cam shaft. In Fig. 2, a card magazine 29, in which master cards are stacked, is provided with a picker knife 31 for feeding a card from the bottom of the stack, through a throat 32, at each stroke of the picker. Operation of the picker 31 by a lever arm 33 under control of a feeler 35 positions the card between opposing magazine feed rolls 34, which close to advance the card to a master presensing mechanism 36 in which the card is detained for sensing by a presensing stop 37. Feed of the card into and out of the presensing mechanism 36 is accomplished by sets of skid rolls 38 which keep the card against the stop 37 during the sensing operation. When the stop opens the card is passed by intermediate feed rolls 39, located between the presensing mechanism and a print position control hole sensing mechanism 41, to the latter, in which skid rolls 42 keep the card against a stop 43 when the card is detained for control hole sensing. When the stop 43 opens the card is passed by said skid rolls and the print feed rolls 44 into a printing mechanism 45 where it may be held by selectively operated stops 1 to 7, inclusive, at different locations for printing or may be discharged therefrom, without printing, to an eject magazine 46 depending upon the operation of control means to be later described. This mechanism referred to is located at the "master" side of the machine and the card supply and eject magazines 29 and 46, respectively, and the intervening sensing mechanisms 36 and 41, respectively, find their counterparts at the "detail" side of machine (Fig. 4) in a detail card magazine 47, picker knife 48, throat 49, picker operating lever 50, magazine feed rolls 51, detail presensing mechanism 52, skid rolls 53, presensing stops 54, intermediate feed rolls 55, print sensing mechanism 56, skid rolls 57, card stops 65, eject rolls 58, and an eject pocket 70.

The master and detail card presensing mechanisms 36 and 52, respectively, as well as the master print position control hole sensing mechanism 41 and the detail print sensing mechanism 56, differ from each other only in some particulars, but are essentially similar to the sensing mechanism shown in Figs. 19, 20 and 23 of U. S. Patent No. 2,387,828, wherein the parts correspond to the present showing (Fig. 2) of a pair of cross bars 59, supporting a sensing platform 61 above which is suitably mounted a perforated sensing stripper plate 62. The platform and plate will be hereafter referred to as the card chamber 60 inasmuch as a card is positioned between the platform and plate, by the feed rolls 34 and the skid rolls 38, in position for the perforations thereof to be sensed when the card is arrested by the card stop 37. The operation of the various stops, used in the different sensing mechanisms, will be brought out in connection with their controlling means. A suitably guided vertically reciprocable sensing pin box 63 is mounted between the card chamber 60 and a stationary pin box unit 64 and in its downward movement is adapted, through its yieldably carried sensing pins 66, to sense the data perforations of a card in the card chamber 60. The upper ends, of the sensing pins 66 that pass through holes in the card, move downwardly and clear the lower ends of pendant or rocker pins 67 which automatically align themselves axially with the sensing pins under pressure applied to the heads of the pendant pins 67 by set pins 68 mounted for vertical yielding movement in the stationary pin box 64. The pins 67 are suspended from a plate 69 for lateral rocking movement in a guide plate 71 and are individually engageable by the projections 72 of a pin reset bar 73 that extends between each of the columns of rocker pins. Each reset bar extends beyond the pin box unit 64 at its opposite ends for engagement respectively with a yieldable spring pin 74 and the edge of a pin reset bail 75 common to all of said bars 73. The bail is suspended from a reset shaft 76 by the arms 77. In the sensing mechanisms different columns of sensing pins can be disabled, in the manner well known in this art, or they may be omitted. In the presensing mechanisms 36 and 52 only the identification patterns of perforations in the master and detail cards will be sensed. In the detail print sensing mechanism 56 only the data pattern perforations will be sensed and in the control hole sensing mechanism 41 only the control hole pattern perforations are sensed. Through the use of a no-card mechanism shown in Fig. 36 and in Figs. 49 and 50 of Patent 2,387,828, when cards are absent from the sensing mechanisms, the pins 67 are prevented from transferring any upward movement of the sensing pins.

The sensing means above described are identified for convenience by the same numerals in the master card and detail card pre-sensing mechanisms 36 and 52, respectively, and in the master card print position sensing mechanism 41 and in the detail card print sensing mechanism 56. The pin box 64 of the master card pre-sensing mechanism 36 is provided with a spring urged pin retract latch bar 78, for each row of pins, which bar abuts a retracted bail 79 suspended by the arms 82 from a retract shaft 81. The detail card print sensing mechanism 56 (Fig. 4) is also provided with like pin retract latch bars 83, in the stationary pin box thereof, which bars abut a retract bail 84 carried on a retract shaft 85 by the bail arms 86. The purpose of the retract bars 78 and 83 is to retain, in the set pins associated therewith, the identification and data patterns of the perforations sensed by the sensing pins. These patterns may be held for part of a cycle or for a number of cycles. The identification pattern of a master card can be held in the pre-sensing mechanism while the identification pattern of a number of detail cards is compared with it, and the data pattern of a detail card can be retained until the stops of a release unit are projected to control the movement of printing wheel positioning racks. In the master card control hole sensing mechanism 41 (Figs. 2 and 36) seven of the sensing, rocker and set pin combinations are shown in a single column and are used to sense holes in a master card. One hole is provided for each item that has been printed on the master card. Further modification of this mechanism 41 involves the use of an auxiliary signal pin and rocker combination 80 that is beyond the edge of the card being sensed (Fig. 41) and operates once in every cycle to send an impulse through wire 460 unless disabled by a rocker pin retract or reset bar 87 shiftable by a reset arm 88 against the action of a spring pin 89. The latter, as well as the reset arm 88 and its operating reset shaft 90, are located inside the stationary pin box of the sensing mechanism 41.

When a master card is released from the sensing mechanism 41 by the stop 43 it is fed by the print feed rolls 44 to the printing mechanism 45 that is controlled by a decoding or stop release unit 91 positioned above the mechanism 41 but not connected thereto. In Patent 2,311,471, above referred to, a card sensing mechanism or different type than the one herein shown is illustrated, but the operation of the decoding unit and the printing mechanism, as fully explained in said patent, can as well be controlled by the detail print sensing mechanism 56 used herein and to this end use is made of a connecting or wire unit 92 which is removably positioned across the machine with one end over the mechanism 56 and the opposite end beneath the decoding or combination plate stop releasing unit 91 so that Bowden wires 93 in the connecting unit can transmit the movement of the detail card sensing pins of mechanism 56 to the combination plates 94 of the unit 91. The plates, by their movement, interpret the perforated code pattern of the sensed detail card in terms of released stop bars 95 (Fig. 2A) which control the movements of printing rack bars 97, the latter of which, through gear trains 98, position type wheels 99 for printing, on a master card, the data interpreted from one or more detail cards. When the plates 94 move to release the spring urged stop bars 95, the latter move to rack arresting position when restoring bails 101 are released by links 102, actuated by crank arms 103 secured to shafts 104. The latter are each actuated at their opposite ends through rock arms 105 by vertical links 106 which in turn are operated through cam levers 107, having roller engagement with cams 108 (Fig. 6) on the main shaft 26. The racks 97 (Figs. 2 and 2A) are released for rising movement under the influence of their springs 109, and restored by a vertically reciprocated rack bail 110. The latter is actuated from the countershaft 27 through the medium of cranks 111, pitmans 112 and slides 113 (Figs. 4 and 6), connecting the pitmans with the opposite ends of said bail.

The openings in the permutation plates 94, that control release of the stop bars 95, are such that they will permit operation of the lowermost stop bars 96 when the plates, corresponding to the data in any column of a card, are not raised as is the case where a card is not present in the sensing mechanism 56. The type wheels 99 (Fig. 27) are prevented from printing, when their associated racks 97 do not rise to release the type wheel carrying arms 114, through the spring biased lock levers 116. Through the medium of column lock stop bars 100, manually settable control mechanism for which is shown in Fig. 28 and hereinafter described, any of the racks 97 can be prevented from operating so that the data to be printed can be selected from any desired columns of the detail card.

The printing or recording mechanism 45 (Figs. 2 and 27) is carried in a frame 117 pivoted on a shaft 118 which is journaled in the walls of the outer and intermediate side frames 20 and 22, respectively, so that the printing mechanism as a unit can be swung upwardly through manual operation of a toggle mechanism 119 to afford access to the platen 120 of the printing chamber. Operation of the printing mechanism is through shaft 27 carrying a number of control cams (Fig. 9) including printing wheel firing cams 121, printing wheel and firing finger restoring cams 122, rack depressor cams 123 and pressure pad cams 124. The auxiliary cam shaft 27 is driven in synchronism with the countercam shaft 26 through a worm gear and wheel combination such as that shown in Fig. 13 of the Ritzert patent above referred to and wherein the shafts 121 and 172 have their counterpart in the present shafts 28 and 27, respectively. The shaft 118 carries, in addition to pinion and gear trains of the type wheel operating gear trains 98, the bell-cranks 126 and 127. Bell-crank 127 is actuated from the restoring cam 122 through a cam arm 129 and a connecting rod 131 to which it is connected by one arm, the other arm of the bell-crank being connected by a restoring link 132 with a bail rocker 133. The latter carries a bail rod 134 which moves out of the path of spring plunger operated firing fingers 135 which force the type wheels 99, with their support arms 114, down to affect printing action when said fingers 135 are released by a firing bail 136. The latter is actuated through a release arm 137, bell-crank 126, draw link 138, cam lever 139 and cam 121. The upper end of the link 138 has pivoted thereto a spring held lockout finger 140 which may be swung, by the action of a Bowden wire, to engage the underside of a fixed rack guide bar 145 to prevent rise of the link 138 and firing of the print wheels.

In order that the printing wheels may be accurately aligned and lost motion between the elements of the gear train counteracted, each rack 97 has a pawl 141 supported within guide combs 142 carried on a bar 143 whose end arms 144 are secured to a rock shaft 146. The latter is rocked by a depressor link 147 from the depressor cam 123 through a bell-crank lever 148. The depressing action of the pawls also lowers the racks slightly to permit withdrawal of the stop bars 95 without friction or jamming.

The position of the line of printing on the master card is determined by a series of spaced stops numbered from 1 to 7, inclusive, which are guided at their upper ends in suitable slots in the platen 120 of the printing chamber. The operation of the stops is determined by the master print position or control hole sensing mechanism 41 through control mechanism to be later described. In each cycle of the machine operation a pressure pad 160 engages the platen to hold any card in the printing chamber from moving during the operation of the stops. The pressure pad comprises a float bar 149 extending across the platen between pad side arms 151 and having suitable bosses on its underside for card holding engagement. Each end of the bar 149, beyond the edge of the platen, carries a stud 152 which is engaged by a plunger 153 forced upwardly by a lift arm 154 against the action of a plunger encircling spring 155 when the roller of a cam lever 156 rides on the high part of a pressure pad cam 124 mounted on shaft 27. Downward pressure on each plunger by the stud 152 is maintained by a spring 157 connecting the end of each side arm 151 with the adjacent printing mechanism frame wall. When the plunger 153 at each side of the platen lowers, under the influence of the cam 124, the springs 157 will cause the side arms 151 and ribbon guides 158 to swing downwardly about their pivotal connections 159 to cause the pad 160 to clamp any card securely to the platen. Skid rolls 161 are associated with the platen to feed the master cards through the printing chamber from whence they are deposited in the master eject magazine 46 by the discharge feed rolls 162.

The data printed on the master cards may be perforated in different fields of the detail cards and while the entire area of the detail card is sensed in the mechanism 56, printing of the particular data selected may be controlled through the use of a column lockout mechanism shown in Fig. 28. In the latter, a spring tensioned lockout stop bar 100, provided for each printing rack bar 97, is notched as at 163 for engagement by the upper end of a detent finger 164 when the bar 100 is held in retracted position by the restoring bail 101 (Fig. 2A). The finger 164 is guided at its upper end in a comb strip 165 and is formed at its lower end to provide an ear 166 and a stem 167, the latter of which, encircled by a spring 168, extends through a guide opening in a bracket 169. The spring urges the finger upwardly for engagement with the lockout bar under control of a manually operated selecting lever 171 pivoted on an assembly rod 172 and having a nose 173 overlying the ear 166. The lever 171 carries a spring biased latch 174 which yieldably holds the lever 171 in either of two positions with respect to a detent plate 175 to prevent or permit operation of the finger 164. Without respect to the operation of the permutation plates 94, the printing rack 97 corresponding to any column of the detail card can be thus prevented from setting the printing wheels or releasing the firing mechanism for printing action.

The master and detail pre-sensing mechanisms 36 and 52, respectively, are aligned transversely of the machine and have positioned between them a data value gauging means or comparing mechanism 176 (Figs. 1, 3, 7 to 10 and 26), which is housed in a frame 177, including side panels 178 and cross bars 179, mounted on suitable support bars secured to the intermediate side frames 22 and 23 of the machine. The detector mechanism 176 compares the sensings of the account numbers sensed in the master and detail cards at the respective sensing stations 36 and 52, and includes two decoding units 182 and 183. The units, arranged in spaced opposing relation, each present a set of permutation plates 184 and a set of stop bars 186 releasable in accordance with adjusted movements of the plates. The plates of the master decoding unit 182 and the detail decoding unit 183 are actuated from the master and detail pre-sensing mechanisms 36 and 52, respectively, through sets of spring tensioned transmission pins 187 that are aligned with the plates 184 and project above the top of the frames 177 for register with the pin and wire elements of a transfer unit 180 that bridges the units 182 and 183. The elements of the unit are also engaged by transmission pins 188 that project from the bottom of the mid-portion of a connection or Bowden wire box 189 (Figs. 2, 3A, 4, and 36) mounted in slide tracks 185 extending across the frame of the machine and, through Bowden wires 190, are connected to similar outer sets of transmission pins 191 which also project from the bottom of the box 189, at the opposite ends thereof for register with the set pins 68 of the master and detail pre-sensing mechanisms 36 and 52, respectively. In the former, the set pins 68, mounted in the stationary pin box units 64, are each provided with a stud 192 for coaction in a well known manner with the latch plate 78. One such latch plate is provided for each column of pins 68 and all are engaged by strip springs 194 and the common latch bail 79 which releases the latched up pins by moving the plates against the resistance of the springs 194 when the bail is actuated by the latch shaft 81, from which it is suspended by the end arms 82. When the master and detail cards are sensed, the pins 68 representing the perforations found in the cards are latched up and through the Bowden wires 190 and the elements of the transfer unit 180 (Fig. 9), move the permutation plates 184 of the master and detail decoding units 182, 183, respectively, downwardly against the resistance of spring tensioned pins 199 in the bottom of the decoding units.

Each decoding unit embodies the operating principles of the decoding units disclosed in Patents 2,311,471 and 2,323,816, above referred to, but differs in that each plate 184, of a group of six that for convenience are identified as A, B, C, D, E, and F (Fig. 10) to correspond to different code perforation positions in each column of a card, is cut to provide four columns of control apertures 200. The different shapes of the apertures in the plates form combinations which control the operation of the stop bars 186 by permitting or preventing movement of their respective aperture engaging studs 201 when the stops are released for projectile movement. As shown diagrammatically in Fig. 10, the studs 201 in section and full extend from the stop bars located at the opposite sides respectively of the same group of plates. Each group of six plates and their flanking columns of stops are controlled from the data perforations in a single column of the card. The units, as above noted, are mounted in opposing spaced relation so that the corresponding stop bars of each unit are in vertical and horizontal alignment and the apertures in the plates of the units are arranged in mirror reverse position so that the stop bars of the master and detail units will move toward each other as seen in Fig. 9.

As many plate and stop groups as are necessary may be employed in each unit for comparing the identifying data of the cards and while the control of the present machine is exemplified by the use of account numbers for identifying the master and detail cards, the detector mechanism will operate equally well in comparing alphabetic identifying data such as the names of customers used with or without account numbers. This is made possible by arranging the vertical rows of apertures in each plate in staggered relation so that all of the apertures will be different distances from the bottom edge of the plate, and looking from left to right at plate A, Fig. 10, for example, it will be seen that the order of progressing increment beginning with column one is column three, column two and column four. In the well known Powers ninety column code arrangement of perforated data, in a card used in controlling the present machine, a single hole 202 in the position A in any column of a card will, upon being sensed, cause plate A to move down so that the stud 203, of the zero stop, abutting the far side of the group of plates, will be unblocked. A single hole 204 in a card in position B will cause plate B to move down and unblock the stud 206 of stop bar "1" abutting the near side of the group. Two holes 207, one in the B position and one in the F position, will cause the plates B and F to move down and unblock the stud 208 of stop bar "2" abutting the far side of the plate group. The lowermost automatic zero stop bars, diagrammatically designated AO will be projected in all columns where no plate of a group is moved, which would be the case in the absence of perforations in certain columns of the master and detail cards, as might occur for instance between the parts of an identifying number. The stop bars at the opposite sides of each plate group, with the exception of the lowermost ones, thus progress alternately from bottom to top in numerical, and alphabetical order and upon being projected, provide mechanically detectable relative positions that indicate an agreement or a difference in the numerical or alphabetical data of the master and detail cards compared.

The plates 184 are guided for movement in upper and lower slotted walls 209. The stop bars are guided at their opposite ends in perforated walls 211 for projection under the influence of their springs when stop bar restoring bails 212, common to bail studs 213 on the stop bars 186, have stop releasing movement under influence of upper and lower rock shafts 214 to which the bails are connected through shift bars 216 and arm 217. The shafts 214 are actuated through arms 225 from cams 215 on the shafts 26 and 30, Fig. 3. As seen in Fig. 11, the inner ends of the stop bars 186, flanking each group of plate 184, are bent to lie close enough together to be projected into the path of the opposite splayed ends of stop gauging rockers 218, one of which is provided for operation between each opposing column of stop bars. Each rocker is pivoted as at 219 (Fig. 9) to the upper end of an individual gauging slide 220, so that a roller 221 carried in the lower free end of the rocker may ride in the vertical slot 222 of a yoke 223 when the slide rises under the influence of lift springs 224 which connect the lower end of each slide with a cross bar 179 of the detector frame 177. Simultaneous rising movement of the slides in suitable guide means 226 is permitted cyclically by a slide restoring bail 227 but the rising movement of any slide may be restricted by contact of its rocker 218 with the stop bars 186 projected from either or both of the master and detail decoding units 182 and 183, respectively. If a released stop bar in any column of stops in the detail unit 183 is the first one engaged by a rising rocker, the latter will tilt and will swing its roller 221 to move the yoke 223 to the left (Fig. 9). If a released stop bar in any column of stops in the master unit 182 is the first one engaged by a rising rocker the latter will swing the yoke to the right. If like stop bars in opposing columns are engaged by a rocker, the latter will not tilt and the yoke will not move. The yokes are suspended in end links 228, pivotally mounted on suitable support rods of the frame 177, and guided at their upper ends in a slotted yoke plate 231. The lateral swinging movement of the yokes and their rockers is limited by stop studs 229 fixed in the upper ends of the slide bars 220. The links 228, suspending one end of each of the yokes 223, are each formed with a depending tail portion 232 (Figs. 12 and 13) for operating the parts of a signal selector or data significance detector unit 233.

The purpose of the unit 233 shown in Figs. 11 to 16, inclusive, is to arrange the cumulative values, represented by the movements of the stop gauging rockers, so that said values can be mechanically analyzed and used to operate suitable means for controlling different functions of the machine. The unit comprises side plates 234 and 236 each having aligned notches 237 and slots 238, in the latter of which are guided the opposite ends of pawl carrying slides 239, each bent in the upper mid-portion to provide a shelf 241 to which, by pivot pins 242 (Figs. 14 and 15) a bracket 243 is secured. The bracket carries spaced pins 244 for engagement by the tail portion 232 of the related yoke link 228 so that when the yokes 223 are moved to the right or left, the associated slide 239 will be correspondingly shifted to engage either of two tumbler pawls 246 and 247, at their tongued outer ends 248, in the notches 237 of the master and detail side plates 234 and 236, respectively. The pawls are pivoted, at their inner ends between the bracket and the shelf, on the pins 242 and are each shaped at their outer opposite side ends to provide, respectively, a cam shoulder 249 and a shoulder recess 251. The pawls are yieldably held in laterally aligned position by springs 252 which connect each pawl carried stud 253 with a pawl abutting stud 254 fixed in the slide shelf 241. The slides and the yokes are each yieldably held, and the pawls are normally positioned centrally of the side plates 234, 236, by a spring tensioned seating cam 256 in engagement with a cam stud 257 projecting from the side of a guide arm 258. The latter is attached to the slide 239 and moves in a slotted plate 259 secured to the underside of cross bars 179 which support the unit as well as slide movement limiting strips 262 spaced outwardly from said side plates.

When the slides 220 have risen and the rockers 218 have gauged the relative positions of the stop bars 186 and moved the yokes 223 accordingly, the latter will shift the pawls 246 and 247, corresponding to the master and detail decoding units respectively, into notching engagement with either of the master or detail side plates 234 or 236, respectively, so that each bank of pawls 246 and 247 may be engaged by feeler bars 263 and 264 Fig. 15, to detect equal or unequal values between the compared data of the master and detail cards. When the corresponding opposed stops 186 are simultaneously contacted by the opposite ends of the rockers 218 the latter will not tilt to cause the related yokes to move the associated pawls, thus indicating that the identifying data in the compared master card and detail cards corresponds.

Through the disposition of the wires 190 in the connection box 189 the master and detail stop groups that control operation of the pawls, arranged from left to right order in Figs. 12 and 15, correspond to the columns of data in the cards. The first pair of pawls represents the first digit of the number or letter of the name and in Fig. 12 similarity or absence of data is illustrated because no pawls have been shifted. In Fig. 15 the pawls of the third slide have been shifted through operation of the corresponding rocker by a stop in the master unit to cause the pawl 246 to engage by its tongue 248 a notch in plate 234, and the tongued end 248 of pawl 247, of the fifth slide, engages a notch in plate 236 by operation of the rocker through a stop in the detail unit. The pawls are adapted to be swung horizontally about their pivots 242 against the tension of the springs 252 and being normally in contact with each other, will all yield under pressure of the feeler bars 263 and 264 when the latter are pressed against the first pair of pawls, if none of the pawls has been latched, as in Fig. 12. When the third and fifth slides have been shifted, as shown in Fig. 15, the feeler bar 263 can move to swing the first two detail pawls 247, because movement of the third slide 239 has positioned the recess 251 of the third pawl 247 to receive the shoulder 249 of the second pawl 247. This movement of the third slide has also latched the third pawl 246 and swinging movement of the first two pawls 246 is thereby prevented. Feeler bar 264 cannot move which indicates a high value on the master side. If the third slide had been moved in the opposite direction and the feeler bar 263 prevented from moving, a high value on the detail side would be indicated. While comparison of the individual values of the identifying data of the master and detail cards is made herein for the purpose of determining equal and unequal conditions, it is evident that the mechanism can be used to indicate sequence conditions of master and detail data if such should be needed.

As shown in Figs. 12 and 13 feeler bars 263 and 264, aligned, respectively, with the rows of pawls 247 and 246 and guided in a bracket 266, are independently slidable for yieldable pawl crowding action by springs 267 acting through a pair of bell-cranks 268 to which the feeler bars are pivoted. Action of the springs, in urging the bell-cranks 268 counter-clockwise, is restrained by a detent rod 269 underlying the spring arm of each bell-crank. The rod is cyclically retracted by a detent link 271 through its pivotal connection 270 with a pair of detent bell-cranks 272 which are in turn pivoted, with the bell-cranks 268, on a shaft 273 journalled in a bracket 274. The bell-cranks 268 have secured thereto the arms 276 to which are pivoted the lift links 277 and 278 which are actuated by movement of the feeler bars 263 and 264, respectively. The upper ends of the lift links 277 and 278 are pivoted as at 279 (Figs. 3, 35 and 41) to signal selector rods 280 and 281, respectively, which are guided for lifting movement in a comb bar 282 and at the ends adjacent the pivot 279 are aligned with the spatulate end 283 of a signal firing ram 284 having a suitable pin and slot connection 286 with an adjacent part of the frame 177. Either of the signal rods 280 and 281 will be moved axially if they are not lifted out of alignment with the firing ram by the action of the lift links as influenced by the movements of the feeler bars in accordance with the pawl settings. In Fig. 15, the feeler bar 264 is prevented from moving and hence the selector rod 281 will remain aligned with the firing ram while the movement of the feeler bar 263 through link 277 will have lifted the selector rod 280 out of alignment with the ram 284. When the latter fires, it will move only the rod 281. The rod 281 which coincides with the master side of the signal detector unit 233, when shifted by the firing ram, operates a Bowden wire 287 (Fig. 7) that controls machine operation while rod 280 which coincides with the detail side of the unit, when shifted by the ram, operates a Bowden wire 288 that connects with a machine function control unit. The firing ram 284 is operated once in each machine cycle by a cam 289 on shaft 30 (Figs. 3 and 7) through a cam lever arm 291 and a sleeved bell-rank 292 suitably pivoted to each other and to a supporting part of the frame. The detent link 271 of the feeler bars is likewise operated from a cam 290 on shaft 30 through a cam lever arm 293 and a link 294, the latter of which is connected to the link 271 by a bell-crank 296, pivoted on a bracket 297.

The driving means for the machine comprises four feed roll drive shafts, extending from front to rear of the machine as shown at 299, 300, 301 and 302 journalled in suitable bearings on the side frames 20, 22, 23 and 21, respectively. Each of the shafts, as well as the arbors of the various feed and skid rolls, mount helical pinions 303 through which said rolls and the counter cam shafts 26, 27, 28 and 30 are driven from the main drive shaft 300. Operation of the latter is controlled either manually or automatically, as will be later explained, through a clutch shaft 304 (Fig. 6) which is rocked against the resistance of a spring 305 to disconnect, through a forked arm 307, the parts of a clutch 306 which transmit the motion of a motor driven belt 308 to said shaft 300. The drive is from the shaft 300 through helical gears 309 and the main cam shaft 26 to shaft 302. The shafts 299 and 301 are driven through the feed rolls and drive those skid rolls that are not driven by the shafts 300 and 302. The cam shafts 26, 27 and 28 (Fig. 36) each carry a gear 311 to provide drive from the shafts 300 and 302 with which said cam shafts are associated. The manual or automatic machine stop means which is shown in Patent 2,151,177 is located adjacent the side frame 20 and, as shown in Fig. 6, includes a cam 312 keyed on the end of cam shaft 28 for actuating a lift bar 313, once in each machine operating cycle, to raise the recessed interponent slide 314 and disengage the clutch 306 through operation of a compound lever 316, a toggle mechanism 315 (Figs. 37 and 38) associated with a vertical link 317 and the pin 325 of a clutch arm 318 fast on the clutch shaft 304. A component portion 319 of the lever 316 carries a block 320 overlying the interponent slide 314 which is pivoted to a spring urged pendant arm 321 whose lower lip end may be engaged by the notched end of a latch 322. The latter as well as a hook arm 323 is pivoted to a rock arm 324 which may be swung counter-clockwise by a manual push rod 326 extending to the exterior of the machine. A Bowden wire 327 is supported in a bracket 328 for actuating an arm 329 fixed to the pivot 331 on which said pendant arm 321 is mounted. The lower end of the link 317 is slotted to receive the clutch arm pin 325, the link having a stud 332 against which the hook arm 323 is held by a suitable spring 340 connecting said hook arm with the link.

A toggle mechanism 315 (Figs. 37, 38 and 39) includes a link toggle 335 and a frame toggle 330, the latter consisting of upper and lower pivotally connected arms 333 and 334, respectively, the upper arm being pivoted on a frame carried stud 336 along with a toggle breaking lever 337 whose upper end carries a breaking pin 338. The latter, at one end, engages the side edge of the upper arm 333 and at the other end passes through a slot in an upper arm 339 of the link toggle 335. The arm 339 is pivoted as at 341 to the link 317 and at its lower end to a lower arm 342 which loosely engages the clutch pin 325 which in turn passes through a slot in the lower end of the toggle arm 334. The upper end of the lever 337, when pushed counter-clockwise by the hook arm 323, will break both toggles in the same direction simultaneously against the resistance of suitable springs 343 which connect the respective arms of each toggle. The action of stopping the machine by the rocking of lever 316 depresses link 317 and through the pin 341, the link toggle forces the clutch pin 325 down and the frame toggle, which was broken while the machine was running, snaps into straight position to hold the pin 325, and its arm 318, down against the action of the clutch spring 305 with the clutch disengaged. The stud 332 lowering with link 317 will allow hook arm 323 and latch 322 to rock clockwise so that the hook will be in toggle breaking position and the latch will be out of alignment with the lip of the pendant arm 321 as shown in Fig. 6. When the rod 326 is pushed, the hook will break the toggles and the spring 305 will close the clutch and start the machine. The link toggle, under pressure of its spring, will straighten as permitted by the slot of arm 339, but the frame toggle will remain broken under upward pressure of the pin 325, Fig. 39. The pin 325 acting through the link toggle 335 will keep the link 317 raised and the stud 332 will rock the hook arm and latch counter-clockwise to lift the hook out of alignment with the toggle breaking lever and lower the notched end of the latch into alignment with the lip of the pendant arm 321. While the machine is running, it may be stopped by manual pressure on the push rod 326 or by an impulse of the Bowden wire 327 to rock the arm 321 through the arm 329. Operation of the push rod 326 will, through the latch 322, rock the arm 321 which will move the interponent slide 314 into position to actuate the lever 316 and depress the link 317 to disengage the clutch. The downward movement of the link toggle 335 pushes the pin 325 down and the frame toggle 330 snaps into straight position to maintain the clutch inoperative, the hook lever being again set for subsequent toggle breaking action.

In order that various operating functions of certain parts of the machine may be regulated, use is made of a signal control unit 400 to and from which impulse signals are mechanically transmitted through Bowden wires as shown diagrammatically in Fig. 41. The mechanisms of the unit are arranged in banks and are controlled in timed operation by cams so that the various banks, which are conditioned by input signals may discharge output signals, unless the latter are annulled by output cancellation signals. The signals, for the purpose of clarity, will be referred to hereafter as input signals, output signals, lower input signals and output cancellation signals.

The signal control unit 400 (Figs. 1, 3, 7 and 18) is located intermediate the side frames 22 and 23, and is housed between side walls 401, joined by top plates 402 and connected by cross shafts 403 providing pivotal and guiding support for the various levers and links of the unit, and by cross rods and bars 404, some of which constitute supporting guides for slides 405 while others serve as means for supporting the unit between the brackets 24 which extend from the side frames 22 and 23 of the machine. The brackets 24 have journalled therein a control unit cam shaft 407 which passes laterally between the input and output portions of the unit, the forward bracket being formed with bearing members 408 for further support of the counter cam shaft 26 which, through a bevel gear combination 409, drives the cam shaft 407. The top plates 402, as well as a lower cross plate 411, are tapped to receive sleeves for mounting the ends of Bowden wires which transmit mechanical impulses to and from the unit. Twelve banks of mechanisms are used in this machine to make up the control unit and are designated banks 1 to 12, inclusive, as shown in detail in Figs. 18 to 22. The banks each include a set of mechanisms which are substantially identical, some of the banks being modified by the omission of certain parts of the mechanisms, and which are best shown in Fig. 18, representing the banks 2 to 8, inclusive. An input signal movement of the print position wire 412 against the flanged upper edge of an input key 413 guided on a shaft 403, rocks a bell-crank 414 counter-clockwise against the resistance of a spring 416 and simultaneously depresses a link 417 which joins one arm of the bell-crank 414 with one arm of a trifurcate bell-crank 418 which operates clockwise against the resistance of a spring 419. Both bell-cranks are pivoted on cross shafts 403, the crank 414 bearing against a cross bar 404, while the crank 418 bears against an adjusting screw 421. The link engaging arm of the bell-crank 418 has pin and slot association with the upper end of a floating link 422 as well as connection through a spring 423 with the mid-portion of said link in which is formed a step 424 having an edge bevel 426. As seen in Fig. 21, the top of the step 424 is adapted to engage the under side of an ear 427 formed on a latch lever 428 fulcrumed on one of the cross shafts 403. The ear end of the latch 428 is connected by a spring 429 to the floating link 422 while the opposite end, turned to provide a toe 431, abuts the cam shoulder 432 of a latch plate 433 which is mounted at one end of the slide 405. The latch 428, on its under edge, presents a heel 434 which extends into one of a number of recesses cut in the upper edge of the slide 405 to form a plurality of shoulders 436, 437, 438 and 439, the latter of which will engage the heel when the slide 405 is released by a bail 441 for movement. The bail 441 referred to as a restoring bail, is common to the slides of the banks 1 to 8, inclusive, and is carried in the lower ends of the bail arms 442 fixed to a shaft 443 journalled in brackets 444 mounted on the side walls 401. Each of the bail arms carries a roller 446 for engagement with a cam 447 keyed to the shaft 407. A spring 445 connecting each arm with a cross bar 404 yieldably maintains the roller in contact with the cam.

The slide 405 is under moving pressure afforded by springs 448 and 449 biasing the lower stud bearing ends of output bell-cranks 451 and 452, respectively, counter-clockwise, so that the stud 453 of the bell-crank 451 forcibly engages the shoulder 437 of the slide and the stud 454 of bell-crank 452 forcibly engages the shoulder 436 of the slide. When the slide is released by its control bail, as will be hereinafter explained, the bell-cranks 451 and 452 swing and lift their respective output keys 456 and 457 to transmit movement to the output Bowden wires 458 and 459, respectively. The wires 458 (Fig. 41) control the operation of the card stops in the printing chamber (Figs. 29-31) and the wires 459 provide lower input signals to the next bank of the series as will be later described. The operation of the Bowden wire 459 can be prevented by output cancellation signals transmitted to the bank through the Bowden wires 461 and 462. The wires 461 are, in effect, extensions of the wires 412 which transmit signals from the print position control hole sensing mechanism 41 and the wires 462 are actuated as the result of a difference in the identifying data of the master and detail cards. Both wires 461 and 462 engage the flanged upper end of a cancellation key 463 (Fig. 18) vertically guided in a comb strip 464 and having pin and slot connection 466 with one end of a blocking lever 467 fulcrumed on a cross shaft 403 and yieldably held in non-blocking position against the top plate 402 by a spring 469. The lower end of the key is connected to the lever by a spring 471 so that the key and the lever may move independently of each other. The blocking end of the lever 467 underlies a block 472 on the bell-crank 452 and is notched as at 473 to engage the block when a movement of the bell-crank 452, to produce an output signal through key 457 and wire 459, is to be prevented.

The banks 1 to 8, inclusive, are used to control the operation of stops in the printing chamber in accordance with the operation of the master card print position sensing mechanism 41 and each bank may condition the bank of next higher numerical order through the output Bowden wires 459 which produce input signals at the lower part of a bank (see Figs. 17 and 18). These wires 459, secured in the lower cross plate 411 providing what, for clarity, will be termed lower input signals, engage a lower input key 474 suitably guided on a cross shaft for vertical movement to rock a bell-crank 476, with which it has pin and slot connection, in clockwise direction so that a link 477 connecting the bell-crank with a cam finger 478 will rock the latter, about its shaft 403, in the same direction against the resistance of a spring 479. The upper cam portion of the finger 478 (Fig. 23) projects through a recess 481 in the side of a slide 482 mounted in a slotted frame 483 into a slot of which extends a tail portion 484 of the floating link 422 and also the reversed end 486 of the slide 482 for swinging the link to the right when the cam finger 478 moves in clockwise direction. This movement of the link 422 unseats the ear 427 (Fig. 18) and unblocks the latch 428 for operation under influence of the spring 429 when the pressure of the latch plate 433 on the toe 431 of the latch is relieved by a full return movement of the bail 441.

Bank 1 (Fig. 17) differs from the banks 2 to 8 in that the output key 457 and the input key 474 and their associated parts, shown in said banks, are omitted. The output cancellation key 463 is adapted to control the operation of a blocking lever 487, similar to the blocking lever 467 of said banks, which lever 487 is extended to engage a block 488 on the output bell-crank 489. The latter is the same as the output bell-crank 451 (Fig. 18), but may be blocked to prevent the output of a signal through the No. 1 card stop control wire 458 and through a wire 459 leading to the input key 474 of bank 2. Bank 1 may receive an input signal through wire 460 from the signal pin 80 (Fig. 41) of the print position sensing mechanism 41 and may receive output cancellation signals to key 463 through wires 461 and 462 whose movements are derived from the mechanism 41 and the signal unit 233, respectively.

Banks 9 and 12 (Figs. 19 and 22) have omitted therefrom the input key 413, link 417, output key 457 and cancellation key 463 as used in banks 2–8, the floating link 422 and latch 428 being controlled by the lower input key mechanism. The bank 9 discharges a signal through wire 491 to actuate each of the wires 462 simultaneously, through a pluralizer bar 490 (Fig. 41) as the result of a lower input impulse through wire 492 which is, in effect, an extension of a wire 493 for delivering an output signal from bank 10 to the lower input of bank 12. Operation of the slide 405 of bank 9 is controlled through a cam 494 and a bail arm 496. The operation of the slide 405 in bank 12 is controlled through a cam 497 and a bail arm 498. An output signal from bank 12 through wire 499 to the print control hole sensing mechanism 41 is used to retract the pin set-up in the latter through operation of the retract bar 87 and the arm 88.

The conditioning bank 10 (Fig. 20) does not employ the output cancellation key 463 and its associated parts or the lower input key 474 and its parts, but is used to receive an input signal through wire 288 (Fig. 41) from the detail side of the signal selector unit 233, indicating that a difference exists in the identifying data of the master and detail cards. This bank produces output signals through key 456 to the Bowden wires 493 and 502 and through key 457 to the output wires 503, 504 and 505 when the slide 405 advances under control of the latch 428, a cam 500, and a bail arm 501. Operation of the wire 502 controls the card stop 54 in the detail pre-sensing mechanism 52. Operation of wire 503 actuates the retract bar 73 to release the pin set-up in the master card pre-sensing mechanism 36. A movement of wire 504, through a pluralizer bar 513, operates the auxiliary wire 506 to allow the master feed rolls 34 to close for card feed and also causes simultaneous movement of the auxiliary wire 507 which prevents closing of the detail feed rolls 51 and feed of a detail card. The wire 505 when operated prevents card feeding action of the picker knife 48 associated with the detail card magazine 47.

The bank 11 (Fig. 21) has omitted therefrom the output key 457 and the lower input key 474 with their respective associated mechanisms so that when movement is transmittted through a Bowden wire 508 (Fig. 41) operated from the output key 456 of bank 8, to the input key 413 of bank 11, it will set the latch 428 through floating link 422 so that upon operation of slide 405, under control of its bail arm 510 and cam 511, an output impulse will be produced by the key 456 through Bowden wires 509, 512 and 327 to simultaneously stop the machine (Fig. 6) and set the print lockout finger 140 (Fig. 27) to prevent a subsequent printing action.

The progress of the master and detail cards through the machine from the supply to the discharge magazines is influenced by action of the various feed rolls and stops, some of which are regulated by the control unit 400. In association with the master feed rolls 34 (Fig. 32) the card feeler 35 includes a slotted card engaging lever finger 514 pivotally associated with the structure of the magazine 29 and adapted to be yieldably urged downwardly at its free end by a spring 516 which is mounted on a detent pin 517. The latter hangs from the slotted end of the finger 514 in positoin to be moved into and out of the path of the upper free end 518 of a detent lever 519 in the absence or presence, respectively, of a card beneath the free end of said finger. The lever 519 and a link arm 521 are connected by a pivot stud 522 for rocking movement when the lever is actuated by a picker lockout cam 523 keyed to the cam shaft 28. The latter also carries a picker cam 524 which oscillates a stud shaft 526 through twin rock arms 527, 528 connected by link 529, against the resistance of a spring 531, to reciprocate the picker knife 31. The link 529 is notched as at 532 to receive the end of a hook lever 533 which is swung about its pivot by a link 534 connected to said arm 521. In the position shown in Fig. 32, a card is not beneath the finger 514 and the pin 517 is spring raised to allow the lever 519, under influence of the low part of the cam 523, to swing the arm 521 and through link 534, move the hook 533 out of engagement with the link 529 so that the spring 531 will actuate the picker knife 31 through arm 33 as a roller 530 on the rock arm 527 follows the contour of the cam 524.

The operation of the feed rolls 34, adjacent the master card magazine 29 and the feed rolls 51 adjacent the detail card magazine 47, is regulated by the control unit 400. As seen in Figs. 2 and 33, the upper feed roll 34 is journaled in side arms 535 pivotally mounted at 536 and having pivoted to one of said arms a drop link 537 which is downwardly tensioned by a spring 539. The link is also pivoted to a cam lever 538 which is fulcrumed at 522 and has its opposite ends arranged to engage, respectively, a cam 542 on shaft 28 and a pivoted block arm 543. The mechanism finds its counterpart adjacent the detail card magazine (Fig. 4) in the arms 544 for supporting the upper one of the set of feed rolls 51, drop link 545, spring 546, cam lever 547 fulcrumed at 541, cam 549 on shaft 30, and block arm 551. The block arms 543 and 551 are tensioned by springs 550 to have blocking and unblocking action with the ends of the cam levers 538 and 547, respectively, When an impulse from bank 10 is transferred from wire 504 through pluralizer bar 513 to the wires 506 and 507, the arms 543 and 551 are moved to unblocking and blocking positions, respectively, so that the master feed rolls 34 will be closed by the spring 539 at the proper time in the cycle as determined by the cam 542 and the detail feed rolls 51 will be prevented from closing. A difference sensed in the identifying data of master and detail cards results in the foregoing action of wires 506, 507 to feed a new master card into the master pre-sensing mechanism 36 and prevent feed of a detail card to the detail pre-sensing mechanism 52.

The stops 37, 43 and 65 for holding and releasing the cards in the master pre-sensing mechanism 36, control hole sensing mechanism 41 and detail print sensing mechanism 56, respectively, are alike and operate once in each machine cycle in opening and closing action in accordance with the timing of their respective cams. The stop 37 is actuated by a cam 552 (Figs. 2 and 34) through a pivotally mounted cam arm and stop arm combination 553. The stop 43 is actuated by a cam 554 (Fig. 2) through a pivotally mounted cam arm and stop arm combination 555 and the stop 65 (Fig. 4) is actuated by a cam 556 through a pivotally mounted cam arm and stop arm combination 557. The stop 54 for holding a card in the detail pre-sensing mechanism 52 for one or more cycles is controlled in its operation by bank 10 of the control unit from which an impulse through wire 502 operates a pivoted stop detent arm 558 against the resistance of a spring 559 to unblock the cam arm 561, of a cam arm and stop arm combination 562, to allow it to engage the low part of a cam 563 to lower or open the stop 54.

The stop mechanism for positioning the card for printing is shown in Figs. 2, 29, 30 and 31 and is controlled for selective operation of each stop by the banks 1 to 7, inclusive, of the control unit 400. The controlling operation of the banks is diagrammatically shown in Fig. 41. The stops are numbered 1 to 7, inclusive, and, when raised in this order, arrest the card so that seven lines of matter can be printed in columnar arrangement from top to bottom on the card. While seven stops are employed in this instance, the use of additional stops and controlling banks therefor is contemplated, if needed. The stop mechanism is housed in a suitable platen supporting frame 564 into which extends a print stop cam shaft 565 mounting a pair of spaced stop retracting cams 566 for contact with the rollers 567 of a retractor 568. The latter comprises end frame pieces 569 guided in brackets 570 and connected by retract strips 571 which pass through and are guided in vertical slots 572 in each stop 573. Each end piece 569 carries a roller 567 so that, once in each cycle of machine operation, the retractor 568 withdraws any stop that projects above the platen in card arresting position. Each stop is substantially of U-shape with the upper free ends disposed in platen slots 574 and vertically movable therein to a position above or below surface of the platen. Each stop member 573 has a pair of spaced downwardly extending tongues 575 carrying studs 576 for engagement with latch openings 577 in a stop release bar 578 provided for each stop. The release bars 578 mounted for sliding movement in the frame 564 are each movable to the right (Fig. 30) against the action of a leaf spring 579 by a bell-crank 581 pivoted in a bracket 582 which supports the end of a Bowden wire 458 in position to operate the bell-crank. One wire 458 from each bank 1 to 7, inclusive (Fig. 41) will operate the respective stop controlled by each bank. After a stop has been lowered by the retract strips 571 under influence of the high parts of cams 566 and automatically latched down against the resistance of its springs 583 by its stop release bar 578, the stop retractor 568 rises under influence of its springs 584 as permitted by the length of the slots 572 in the stops. The retract strips 571 will thus be out of the way of the next stop to be released. The cam shaft 565 is driven through a spur gear combination 585 from a stud shaft 586 which in turn is driven from the shaft 27 through a bevel gear combination 587.

The raising and lowering of the stops 1 to 7 and the card gripping and release action of the pressure pad 160 (Fig. 27) are coordinated in operation so that the pad is raised while a card is fed into the printing chamber against a stop. The pad then grips the card, the stop is retracted, printing occurs, the next stop is raised and then the pad is lifted so that the card advances to said next stop or leaves the printing chamber if no other stops are raised.

First cycle

For a description of the operation of the machine in handling representative groups of master and detail cards, reference will be made to each succeeding cycle to be read in conjunction with the timing charts of Figs. 42 to 47, inclusive, and the diagrammatic illustration in Figs. 1 and 41 of the machine and its control unit 400 shown at the zero degree position. At the start of a run, a master card 12M and a detail card 12D are advanced by their respective picker knives 31 and 48, at 170° of the first cycle, to a position between the feed rolls 34 and 51. The detail feed rolls 51 close at 265° and feed the detail card 12D into the detail pre-sensing chamber 52 so that it positions against the card stop 54 at 338°. The master card 12M remains between the feed rolls 34 which are closed only as the result of an unequal signal resulting from a difference in the identifying data of the master and detail cards.

Second cycle

In the second cycle, the detail card 12D is initially sensed in the detail pre-sensing mechanism 52. No master card has been fed to the master pre-sensing mechanism 36 and the latter, through operation of its "no-card" pin mechanism, will be prevented from delivering any data set-up to the detector unit 176. The latter, however, will receive through the wires 190, between 80° and 100°, the result of the sensing of the detail card, and an unequal signal from the selector unit 233 through wire 288 to the input key 413 of bank 10 of the control unit will be delivered at 215°. The cam 500, through the keys 456 and 457, will cause bank 10 to deliver an impulse at 245° through each of the wires 493, 502, 503, 504 and 505. Wire 493 and its component wire 492 operate the lower input keys 474 of banks 12 and 9, respectively, to condition both the banks 9 and 12 for action in the next cycle. Wire 502 prevents opening of the detail card stop 54 in the pre-sensing mechanism 52 to detain the card 12D therein for sensing again in the next cycle. Wire 503 causes operation of the retract bar 78 in the master pre-sensing mechanism 36. Wire 504 transfers its impulse to the wires 506 and 507 which, by their respective simultaneous actions, permit closing of the master card magazine feed rolls 34 at 265° and prevent closing of the detail magazine feed rolls 51. Through wire 505 the picker 48 of the detail magazine 47 is rendered inoperative to feed another detail card.

The master card 12M is fed to the pre-sensing mechanism 36 at 265° and abuts the card stop 37 therein at 338°.

Third cycle

In the third cycle the master card 12M and the detail card 12D are pre-sensed simultaneously at 28° and the result of the sensings delivered to the detector unit 176 between 80° and 100°. Due to the fact that the identifying data in both cards is the same, the detector will not affect the pawls of the selector unit 233 and no signal will be transmitted to the control unit 400. However, bank 12 having been conditioned in the second cycle by wire 493 will discharge an impulse at 90° through wire 499 to the control hole sensing mechanism 41 to move and hold the reset bar 87 from 90° to 230° so that the rocker pins 67 are ineffective, on a sensing action of the mechanism 41, to transmit signals to the control unit so that the setting up of any card stops in the printing mechanism 45 is prevented when the compared identifying data of the master and detail cards is different. For convenience, this difference will be hereafter referred to as an "unequal" condition, and when the data is the same, the condition will be referred to as "equal." Bank 9, conditioned in the second cycle, will deliver an output cancellation signal at 230° through the wire 491, pluralizer bar 490 and wires 462, to each of the banks 1 to 8, inclusive. This cancellation signal will prevent the transmission of an output signal from any bank that might have been previously conditioned by the mechanism 41, in sensing the control holes of a master card such as 14M (Cycle 8, Fig. 41) for which there was no corresponding detail card, with the result that the card stops in the printing chamber are prevented from rising. Due to the fact that an equal condition has no effect on the control unit 400, the card stops 54 in the detail pre-sensing mechanism 52 open at 265° and the detail card 12D is advanced to abut the card stops 65 in the print sensing mechanism 56 at 355°.

The master card is advanced to abut the stops 43 in the control hole sensing mechanism 41 at 355° when the stops 37 in the master pre-sensing mechanism 36 normally open at 265°.

Also, during this cycle the absense of a master card is detected by the feeler 35 and causes a new master M13 to be positioned at 170° between the open feed rolls 34.

On the detail side of the machine, the detail card 12D2 is fed at 265° into the pre-sensing mechanism 52 to abut the stops 54 at 338°.

Fourth cycle

At 28° of this cycle, card 12D2 is pre-sensed and as the set-up of the master 12M in the mechanism 36 has not been retracted, an equal condition prevails and no signal is passed to the control unit.

The detail card 12D is sensed by the print sensing mechanism 56 at 68°, the stop bars 95 of unit 91 (Fig. 2A) are fully out at 202° and the rack bars 97 have positioned the printing wheels by 337°.

The master card 12M is sensed at 108° in the control hole sensing mechanism 41. In this mechanism (Fig. 41) only a single column of seven card sensing pins representing a like number of possible lines of printing on the master card, is used, along with the auxiliary signal pin 80 for actuating the wire 460. When a master card is blank, a signal is thus given through 460 to bank 1 by the pin 80 at about 180°. If, however, the control unit had been conditioned by an unequal signal, the reset bar 87 in the mechanism 41 would hold the rocker pins inoperative and no signal would be transmitted by the pin 80. The master card 12M is blank and as an equal condition exists, the pin 80 gives a signal through wire 460 to bank 1. At 310° a signal through wire 458 from bank 1 releases the number 1 stop which is fully up at 328° in accordance with the operation of cam 566 and which stop the master card 12M engages at 355° to be held in the printing chamber. Also at 310° a signal from bank 1 through wire 459 goes to the lower input key 474 of bank 2 conditioning the latter for operation in the next cycle.

Cards 12M and 12D were released by operation of the card stop in their respective mechanisms 41 and 56 at 290° and advanced to the printing mechanism 45 and eject pocket 70, respectively.

A detail card 13D is passed by the feed rolls into the pre-sensing mechanism 52 at 265°.

*Fifth cycle*

At 29° of this cycle the print wheels are fired and print, on the first line of the master card 12M, the data that was sensed in the detail card D12.

At 28° the identifying data of detail card 13D is sensed and delivered to the detector unit 176 between 80° and 100°. The identifying data "13" of the detail card is compared with the master identifying data "12" that was retained in the mechanism 36 by the master retract latch bars 78, thus indicating an unequal condition. Card 12D2 is print sensed at 68° and the data therefrom transmitted between 100°–140° to the printing mechanism. At 215° the unequal signal from the unit 176 is relayed through wire 288 to bank 10 and upon operation of the latter at 245° prevents the detail pre-sensing card stop 54 from opening through wire 502; retracts the set-up of data "12M" in the master pre-sensing mechanism 36 through wire 503; prevents closing of the detail feed rolls 51 and permits closing of the master feed rolls 34 through the wires 504, 506 and 507, and through wires 493 and 492 conditions the banks 9 and 12, by lower input signals, to function in the next cycle.

The master card 13M is fed into the pre-sensing mechanism at 265°.

At 293° the No. 1 stop is retracted while the card is held by the pad and at 310°, bank 2, which was conditioned by a signal from bank 1 through one of the wires 459 in the preceding cycle, operates to deliver a signal through one of the wires 458 to unlatch the No. 2 card stop and allow it to rise after which the pad releases the card for advance to said No. 2 stop. Bank 2 also transmits a signal through one of the wires 459 to the lower input key 474 of bank 3 to prepare the latter for operation in the next cycle. The absence of a card in the control hole sensing mechanism 41 will result in movement of the reset bar 87 in said mechanism through operation of the "no card" device to prevent transmission of any signals to the control unit 400.

*Sixth cycle*

At 29° printing of the data that was sensed in card 12D2 is done on the second line of card 12M and at 293° the No. 2 stop is retracted while the pad holds card 12M. The card feeler 35 causes master card 14M to be positioned between the open master magazine feed rolls. At 28° the master card 13M and detail card 13D are pre-sensed, the data being delivered to the detector unit 176 and indicating an equal condition in which no signal is passed to the control unit. Prior to 107° the bank 12, which was conditioned by the unequal signal in the preceding cycle, delivers a signal through wire 499 to the reset bar 87 of the print control hole mechanism to hold the rocker pins thereof ineffective. Bank 9, at 230°, delivers an output signal through wire 491 to actuate all of the wires 462, through the pluralizer bar 490, to prevent the transmission of any output signals from the banks 1 to 8, inclusive, such, for instance, as from bank 3 which had been previously conditioned to set up the stop 3 in the printing chamber. Thus, no card stops are raised in the printing chamber and the card 12M passes out of the printing chamber and into eject magazine 46 when the pressure pad releases it at 340°. No card is present in the mechanism 41 during sensing action thereof, and in the absence of a signal from the control unit 400, the card stops in the master and detail pre-sensing mechanism 36 and 52, respectively, are opened at 265° and the cards 13M and 13D advance to the control hole sensing mechanism 41 and the print sensing mechanism 56, respectively. At the same time (265°) detail card 17D is fed to the detail pre-sensing mechanism 52.

*Seventh cycle*

In this cycle, detail card 17D is pre-sensed at 28° and the data thereof compared with the "13M" set-up retained in the master pre-sensing mechanism, producing an unequal signal through the selector unit 233. The unequal signal through wire 288 conditions bank 10 at 215° for operation at 245°; to prevent opening of the card stops in the detail pre-sensing mechanism through wire 502; to retract the "13M" set-up in the master pre-sensing mechanism through wire 503; to prevent closing of the detail feed rolls 51 and permit closing of the master feed rolls 34 through the wires 504, 506 and 507; and to condition the banks 9 and 12 through wires 493 and 492 for operation in the next cycle.

The master card 14M is fed into the pre-sensing mechanism at 265°.

At 68° the data from the detail card 13D was print-sensed and transmitted to the printing mechanism between 120° and 140°. The card 13M having three lines of printing thereon already, contains three control holes which are sensed at 128°. An impulse through wire 460 to bank 1 conditions the latter to give an output signal. Impulses through the wires 412, from the Number 1, 2 and 3 control hole pins, and through the wires 461, condition the banks 2, 3 and 4 for output and enter output cancelling impulses into the banks 1, 2 and 3, respectively, so that when the slides 405 of each bank are released, only bank 4 may operate through the wire 458 to release the No. 4 print stop, and through wire 459, condition bank 5 for operation in the next cycle. Bank 4, at 310°, will deliver an impulse through wire 458 to release the No. 4 print stop so that the card 13M will move against the stop 355° when it is released from the mechanism 41.

At 265° the master feed rolls advance the card 14M to the pre-sensing mechanism 36 and at 290° the card stops 65 in the print sensing mechanism 56 are lowered to pass the card 13D to the eject pocket 70.

*Eighth cycle*

At 18° the print wheels are fired to print the data from detail card 13D on the fourth line of master card 13M.

Prior to 23° a "no card" condition is sensed and master card 17M is fed between the master feed rolls 34 at 170°.

At 28° detail card 17D, which was detailed in the pre-sensing mechanism, and the card 14M are sensed, producing an unequal signal which causes the selector unit 233 to transmit a signal at 215° to bank 10. The latter, at 245°, operates through wire 502 to prevent opening of the card stops in the mechanism 52, retracts the master set-up in mechanism 36, blocks feed of the detail card feed and unblocks feed of the master card through wires 504, 506 and 507 and conditions banks 9 and 12 through wires 493 and 492 for operation in the next cycle.

During this time, at about 107°, bank 12, which was conditioned in the previous cycle, operates through wire 499 to hold the reset bar 87 of the print position sensing mechanism 41 ineffective. Bank 9 discharges impulses through wires 491 and 462 to cancel any output action of the banks 1 to 8, inclusive, with the result that operation of bank 5, as conditioned by bank 4 in the seventh cycle, will be prevented. No card stop will be released and at 340°, when the pressure pad is raised, the card 13M will be fed to the master eject magazine 46.

At 265° the master card 14M is fed to the control hole sensing mechanism 41 and the master card 17M is advanced to the pre-sensing mechanism 36.

*Ninth cycle*

At 28° the master card 17M and the detail card 17D are sensed and their data delivered to the detector unit 176 between 80° and 100°. This data indicates an equal condition and no signal will be passed to the control unit.

At 180° the control hole mechanism 41 will sense the master card 14M which has two control holes indicating two lines of printing theron. Prior to 180° bank 12 has transmitted a signal through wire 499 to hold the reset bar 87 of the control hole mechanism 41 ineffective so that no signals will be transmitted to banks 1, 2 or 3.

At 265° the card stops in the pre-sensing mechanism 36 and 52 are lowered and the cards 17M and 17D start their advance to the print control mechanism 41 and the print sensing mechanism 56, respectively.

At 290° the card stops in the mechanism 41 open and card 14M passes through the printing mechanism to the master eject magazine 46 due to the fact that no card stops have been elevated in the printing mechanism.

*Tenth cycle*

At 68° the detail card 17D is print sensed and the data thereof delivered to the printing mechanism between 120° and 140°. At 180° the master card 17M is sensed in the control hole sensing mechanism 41 and, being a blank card, one impulse through wire 460 to bank 1 will be produced. At 310° bank 1 causes the No. 1 card stop in the printing chamber to be released through operation of the wire 458 and also, through wire 459, conditions bank 2 for operation in the next cycle.

At 290° the card stops in the print sensing mechanism 56 and in the control hole sensing mechanism 41 are lowered and the detail card 17D passes to the detail eject pocket 70, and the master card 17M goes into the printing chamber to abut the No. 1 card stop at 355° and be printed upon at 29° of the next cycle.

If the master card 17M had contained seven lines of printing instead of being blank, the seventh control hole would have transmitted a signal through wire 412 to bank 8. The latter, at 310° would deliver a signal through wire 508 to the input key 413 of bank 11 which in turn would produce an impulse through wire 509 and wire 327 to stop the machine.

The stopping of the machine in this manner indicates to the operator that a master card on which no more printing can be placed is in the stack by error. The operator then removes the full card and substitutes a new blank master card.

While we have described what we consider to be a highly desirable embodiment of our invention, it is obvious that many changes in form could be made without departing from the spirit of our invention, and we, therefore, do not limit ourselves to the exact form herein shown and described, nor to anything less than the whole of our invention as hereinbefore set forth, and as hereinafter claimed.

What we claim as new, and desire to secure by Letters Patent, is:

1. The combination in a machine including a magazine for holding master cards having identification and print position perforation patterns therein, a magazine for holding detail cards having identification and data perforation patterns therein, means for successively sensing the identification and print position perforation of the master cards, means for successively sensing the identification and data perforations of the detail cards, means for comparing the sensing action of said identification sensing means, master card printing means controlled by said data sensing means, stops for detaining the master and detail cards in their respective sensing means, feeding means for advancing said master and detail cards from their respective magazines through the machine including successively arranged sets of feed rolls and a picker knife in each magazine for feeding the cards to first sets of feed rolls; of control means including a bank of signal control units, means for opening and closing said first sets of feed rolls, means biased to blocking and unblocking positions with respect to said opening and closing means, means operable by said comparing means for conditioning said control units to produce a signal when said comparing means indicates an unequal sensing action of said identification sensing means, and means actuated by one of said signal control units for moving said biased means to unblock the closing means of one set of rolls, for moving said biased means to block the closing means of the other set of rolls and to hold the stop in the detail card identification sensing mechanism closed.

2. In a machine of the character described, the combination with progressively arranged master card perforated identification pattern and control pattern sensing ments, progressively arranged detail card perforated identification and data pattern sensing means, master card printing means controlled by said detail card data pattern sensing means, means for feeding the cards to said sensing means, stops for detaining the master and detail cards in the respective sensing means, successively operable stops for detaining the master card in the printing means and means for feeding the master cards through said printing means; of means for comparing the ordinal values of the master and detail cards sensed in said identification pattern sensing means, a control unit including banks of signal mechanisms, means for actuating said banks cyclically, means connecting some of said banks for series operation, connections between said banks and said master card stops for operating the latter in progressive order to detain a master card at different positions in said printing means, and means operated by said control pattern sensing means for conditioning a first bank for said series operation.

3. In a machine of the character described, the combination with progressively arranged master card perforated identification pattern and control pattern sensing means, progressively arranged detail card perforated identification and data pattern sensing means, master card printing means controlled by said detail card data pattern sensing means, stops for detaining the master and detail cards in the respective sensing means and for detaining the master card in the printing means and means for feeding the cards to said sensing means; of means for comparing the ordinal values of the master and detail cards sensed in said identification pattern sensing means, a control unit including banks of signal mechanisms, means for actuating said banks cyclically, means actuated by said comparing means for conditioning one of said banks, means operated by said bank for conditioning a plurality of banks for subsequently cycling operation, and means controlled by one of said conditioned banks for disabling said control pattern sensing means.

4. In a machine of the character described, the combination with progressively arranged master card perforated identification pattern and control pattern sensing means, progressively arranged detail card perforated identification and data pattern sensing means, master card printing means controlled by said detail card data pattern sensing means, stops for detaining the master and detail cards in the respective sensing means and for detaining the master card in the printing means and means for feeding the cards to said sensing means; of means for comparing the ordinal values of the master and detail cards sensed in said identification pattern sensing means, a control unit including banks of signal mechanisms, means for actuating said banks cyclically, means actuated by said comparing means for conditioning one of said banks, means for producing output signals from said signal mechanisms, means operated by said one bank for conditioning a plurality of banks for subsequent cycling operation, and means controlled by one of said conditioned banks for disabling the output signal producing means of some of said signal mechanisms.

5. In a machine of the character described, the combination with progressively arranged master card perforated identification pattern and control pattern sensing means, progressively arranged detail card perforated identification and data pattern sensing means, master card printing means controlled by said detail card data pattern sensing means, means for feeding the cards to said sensing means, stops for detaining the master and detail cards in the respective sensing means, successively operable stops for detaining the master card in the printing means and means for feeding the master cards through said printing means; of means for comparing the ordinal values of the master and detail cards sensed in said identification pattern sensing means, a control unit including banks of signal mechanisms, means for actuating said banks cyclically, means connecting some of said banks for series operation, connections between said banks and said master card stops for operating the latter in progressive order to detain a master card at different positions in said printing means, means operated by said control pattern sensing means for conditioning a first bank for said series operation, and means operated by the last bank of said series for stopping said machine.

6. The machine of claim 1 in which said card feeding means includes a detent lever, means for cyclically swinging said detent lever, a hook lever movable by said detent lever to arrest the feeding movement of said picker, a feeler for engaging a card as it moves from the supply means to a position between first set of feed rolls and means actuated by said feeler for arresting the movement of said detent lever and said hook in picker disabling position.

References Cited in the file of this patent

UNITED STATES PATENTS

| | | |
|---|---|---|
| 1,110,723 | Spiess | Sept. 15, 1914 |
| 1,564,221 | Duncan | Dec. 8, 1925 |
| 1,717,231 | Krell | June 11, 1929 |
| 1,853,215 | Lorant | Apr. 12, 1932 |
| 1,862,032 | Pierce | June 7, 1932 |

(Other references on following page)

UNITED STATES PATENTS

| | | |
|---|---|---|
| 2,125,199 | Rheutan | July 26, 1938 |
| 2,151,177 | Alvine | Mar. 21, 1939 |
| 2,192,610 | Keen | Mar. 5, 1940 |
| 2,211,310 | Andrews | Aug. 13, 1940 |
| 2,311,471 | Ritzert | Feb. 16, 1943 |
| 2,344,345 | Elliott | Mar. 14, 1944 |
| 2,406,040 | Ryan | Aug. 20, 1946 |
| 2,412,527 | Mills | Dec. 10, 1946 |
| 2,550,370 | Mueller | Apr. 24, 1951 |
| 2,627,805 | Reitfort | Feb. 10, 1953 |
| 2,632,644 | Wockenfuss | Mar. 24, 1953 |